United States Patent [19]
Nakano et al.

[11] Patent Number: 5,933,782
[45] Date of Patent: Aug. 3, 1999

[54] DOWNLINK TRANSMISSION POWER CONTROL SCHEME FOR MOBILE COMMUNICATION SYSTEM USING SITE DIVERSITY

[75] Inventors: Etsuhiro Nakano; Takehiro Nakamura, both of Yokosuka; Koji Ohno; Takaaki Sato, both of Yokohama, all of Japan

[73] Assignee: NTT Mobile Communications Network Inc., Tokyo, Japan

[21] Appl. No.: 08/903,025

[22] Filed: Jul. 29, 1997

[30] Foreign Application Priority Data

Jul. 29, 1996 [JP] Japan .................................. 8-199011
Aug. 13, 1996 [JP] Japan .................................. 8-213912

[51] Int. Cl.$^6$ .................................................. H04B 1/00
[52] U.S. Cl. ............................................ 455/522; 455/69
[58] Field of Search .............................. 455/69, 436, 437, 455/438, 439, 442, 522; 370/331, 332, 333, 334

[56] References Cited

U.S. PATENT DOCUMENTS 5,265,119 11/1993 Gilhousen et al. ....................... 455/69
5,487,180 1/1996 Ohtake ..................................... 455/69
5,771,451 6/1998 Takai et al. ............................. 455/522
5,878,350 3/1999 Nakamura et al. ..................... 455/522

FOREIGN PATENT DOCUMENTS 0 680 160  4/1995  European Pat. Off. ........ H04B 7/005

*Primary Examiner*—Reinhard J. Eisenzopf
*Assistant Examiner*—Makoto Aoki
*Attorney, Agent, or Firm*—Oblon, Spivak, McClelland, Maier & Neustadt, P.C.

[57] ABSTRACT

A downlink transmission power control scheme for a mobile communication system using the site diversity, which carries out a primary downlink transmission power control using a primary control signal which is transmitted from the mobile station and terminated at each base station, and an additional downlink transmission power control using additional control signals which are transmitted from the base station control station to the base stations. The additional downlink transmission power control may also use a secondary control signal which is transmitted from the mobile station and terminated at the base station control station. The primary downlink transmission power control can be carried out during a non-site diversity period while the additional downlink transmission power control is carried out during the site diversity period, or the primary downlink transmission power control and the additional downlink transmission power control can be both carried out during the site diversity period.

50 Claims, 23 Drawing Sheets

FIG. 17

| BER | LAYER-3 CONTROL SIGNAL |
|---|---|
| 5%~ | 111 |
| 2%~5% | 110 |
| 1%~2% | 101 |
| 0.5%~1% | 100 |
| 0.2%~0.5% | 011 |
| 0.1%~0.2% | 010 |
| 0.05%~0.1% | 001 |
| 0~0.05% | 000 |

|  | BASE STATION 1 | BASE STATION 2 |
|---|---|---|
| PERCH CHANNEL RECEIVING SIR | 20dB | 15dB |
| COMMUNICATION CHANNEL RECEIVING SIR | 5dB | 2dB |

DOWNLINK TRANSMISSION POWER CONTROL SCHEME FOR MOBILE COMMUNICATION SYSTEM USING SITE DIVERSITY

BACKGROUND OF THE INVENTION

1. Field of the Invention

The present invention relates to a downlink transmission power control scheme for realizing an efficient transmission power control with respect to downlink radio signals which are transmitted from base stations to a mobile station via radio channels in a mobile communication system using a site diversity.

2. Description of the Background Art

A radio communication scheme can incorporate a transmission power control for the purpose of suppressing a transmission power to a minimum necessary level. By carrying out this transmission power control, it is possible to realize such advantageous effects as a saving of power consumption and a reduction of interferences with respect to other radio channels. In particular, in the CDMA (Code Division Multiple Access) scheme, a lower amount of interferences directly implies a larger subscriber capacity, so that the transmission power control is an indispensable technique.

On the other hand, one known technique for reducing interferences in the CDMA scheme is the site diversity, which is a technique in which a mobile station and a plurality of base stations are simultaneously connected and a diversity combining is carried out among a plurality of base stations. This site diversity is capable of satisfying a given communication quality by using a less transmission power, so that the interferences can be reduced and the subscriber capacity can be increased.

Now, in the radio communication in general, the propagation loss is not identical for the uplink channel from a mobile station to a base station and the downlink channel from a base station to a mobile station. Consequently, in order to improve the transmission power control precision, it is preferable to carry out the closed loop transmission power control.

In the closed loop transmission power control, a base station transmission power in a downlink communication channel is controlled by a transmission power control signal according to a receiving quality measured at a mobile station as indicated in a part (b) of FIG. 1, while a mobile station transmission power in an uplink communication channel is controlled by a transmission power control signal according to a receiving quality measured at a base station as indicated in a part (a) of FIG. 1.

For example, such a closed loop transmission power control can be realized by using one bit information as follows. Namely, a receiving side transmits to a transmitting side a transmission power control command which indicates "0" when the receiving quality measured at the receiving side does not satisfy a required quality, or "1" when the receiving quality measured at the receiving side satisfies the required quality. Then, at the transmitting side, the transmission power is raised by one step when the transmission power control command indicates "0", or lowered by one step when the transmission power control command indicates "1". By carrying out this control continuously, it is possible to maintain the receiving quality nearly at a level of the required quality.

This closed loop transmission power control can be realized by using either a control signal which is terminated between a mobile station and a base station, or a control signal which is terminated between a mobile station and a base station control station. In the latter case, the control signal transmitted by a mobile station is received by a plurality of base stations and combined during a site diversity period, and then transmitted to a base station control station.

The control signal terminated between a mobile station and a base station is usually transmitted on layer-1, and will be referred to as the layer-1 control signal. The control signal terminated between a mobile station and a base station control station is usually transmitted on layer-3, and will be referred to as the layer-3 control signal.

In a case of realizing the closed loop transmission power control, a higher transmission power control precision can be realized by a shorter transmission power control period. From this point of view, it is more convenient to transmit the transmission power control signal as the layer-1 control signal, because the layer-1 control signal does not require the encoding processing or the re-transmission processing so that a very fast transmission power control can be realized.

FIG. 2 shows an exemplary case of the downlink transmission power control using the layer-1 control signal. In this case, a loop is formed between a mobile station and a base station, so that it is possible to realize a fast transmission power control with a small control delay and therefore it is possible to reduce a transmission power control error.

However, the layer-1 control signal is to be received independently by each base station, so that there is a problem in realizing the control during a site diversity period. Namely, when a control for maintaining a quality after the site diversity combining above a certain level is carried out in the uplink channel, it becomes impossible to maintain a sufficient uplink receiving quality at some base station among a plurality of base stations that are simultaneously connected with a mobile station, so that there is a possibility for raising an error rate of the layer-1 control signal transmitted from a mobile station to a base station. At such a base station, the transmission power control error becomes large so that an amount of interferences is increased and this in turn causes a lowering of a capacity in a case of the CDMA mobile communication system.

FIG. 3 shows an exemplary case of the downlink transmission power control using the layer-3 control signal. In this case, during a site diversity period, the layer-3 control signal is combined at an exchange station and then transmitted to a base station control station. Consequently, the reliability of the layer-3 control signal is quite high and the transmission powers of the base stations are always controlled uniformly according to the same information.

However, due to the transmission delay of the layer-3 control signal, it is impossible to realize a fast transmission power control, and a capacity is lowered as the transmission power control error becomes large. In addition, there is also a problem that an amount of control signals to be transmitted between a base station and a base station control station is increased.

Conventionally, the closed loop transmission power control has been realized either by always using the layer-3 control signal as in a case of FIG. 3, or by always using the layer-1 control signal as in a case of FIG. 2.

Thus, when the transmission power control by always using the layer-1 control signal is carried out in a mobile communication system using the site diversity, there arises a problem of an increased transmission power control error during a site diversity period. On the other hand, when the transmission power control by always using the layer-3 control signal is carried out in a mobile communication system using the site diversity, there arises a problem of an increased transmission power control error and an increased amount of signals transmitted between stations during a non-site diversity period. Here, an increased transmission power control error can cause an increase of interferences which in turn can cause a lowering of a capacity in the CDMA mobile communication system.

SUMMARY OF THE INVENTION

It is therefore an object of the present invention to provide a downlink transmission power control scheme for a mobile communication system using the site diversity, which is capable of improving the transmission power control precision, and reducing an amount of interferences and thereby increasing a capacity in a case of the CDMA mobile communication system.

It is another object of the present invention to provide a downlink transmission power control scheme for a mobile communication system using the site diversity, which is capable of realizing the transmission power control with a small control error and a less amount of signals to be transmitted between stations.

It is another object of the present invention to provide a downlink transmission power control scheme for a mobile communication system using the site diversity, which is capable of realizing a small transmission power control error during a site diversity period even when a transmission power control signal terminated between a mobile station and a base station is used.

According to one aspect of the present invention there is provided a method of downlink transmission power control in a mobile communication system formed by a plurality of base stations, a mobile station to be connected with the base stations via radio channels, and a base station control station for controlling the base-stations, wherein the mobile communication system uses a site diversity in which the mobile station is simultaneously connected with more than one base stations and a diversity combining among said more than one base stations is carried out, the method comprising the steps of: carrying out a primary downlink transmission power control using a primary control signal which is transmitted from the mobile station and terminated at each base station and not to be combined during a site diversity period; and carrying out an additional downlink transmission power control using additional control signals which are transmitted from the base station control station to the base stations.

According to another aspect of the present invention there is provided a mobile communication system, comprising: a plurality of base stations; a mobile station to be connected with the base stations via radio channels, which transmits a primary control signal which is to be terminated at each base station and not to be combined during a site diversity period so as to carry out a primary downlink transmission power control at each base station according to the primary control signal; and a base station control station for controlling the base stations, which transmits additional control signals to the base stations so as to carry out an additional downlink transmission power control at the base stations according to the additional control signals; wherein the mobile communication system uses a site diversity in which the mobile station is simultaneously connected with more than one base stations and a diversity combining among said more than one base stations is carried out.

Other features and advantages of the present invention will become apparent from the following description taken in conjunction with the accompanying drawings.

BRIEF DESCRIPTION OF THE DRAWINGS

FIG. 17 is a table showing exemplary layer-3 control signal contents that can be used in the first specific embodiment of the present invention.

DETAILED DESCRIPTION OF THE PREFERRED EMBODIMENTS

Referring now to FIG. 4 to FIG. 10, some basic embodiments of a downlink transmission power control scheme for a mobile communication system using the site diversity according to the present invention will be described.

In the following description, a control signal which is terminated between a mobile station and a base station and which is not to be combined at an exchange station during a site diversity period will be referred to as the layer-1 control signal, although such a control signal is not necessarily limited to just the layer-1 control signal in general and the layer-1 control signal is not required to have this characteristic by definition in general. This layer-1 control signal is also referred to as a transmission power control command or a power control bit in practice. Also, a control signal which is terminated between a mobile station and a base station control station and which is to be combined at an exchange station during a site diversity period will be referred to as the layer-3 control signal, although such a control signal is not necessarily limited to just the layer-3 control signal and the layer-3 control signal is not required to have this characteristic by definition in general. Note also that a base station control station is functionally separated from an exchange station in the following description, although a function of a base station control station can be integrally incorporated into an exchange station without providing physically separate base station control station and exchange station in some practical system configuration.

Figure 1:
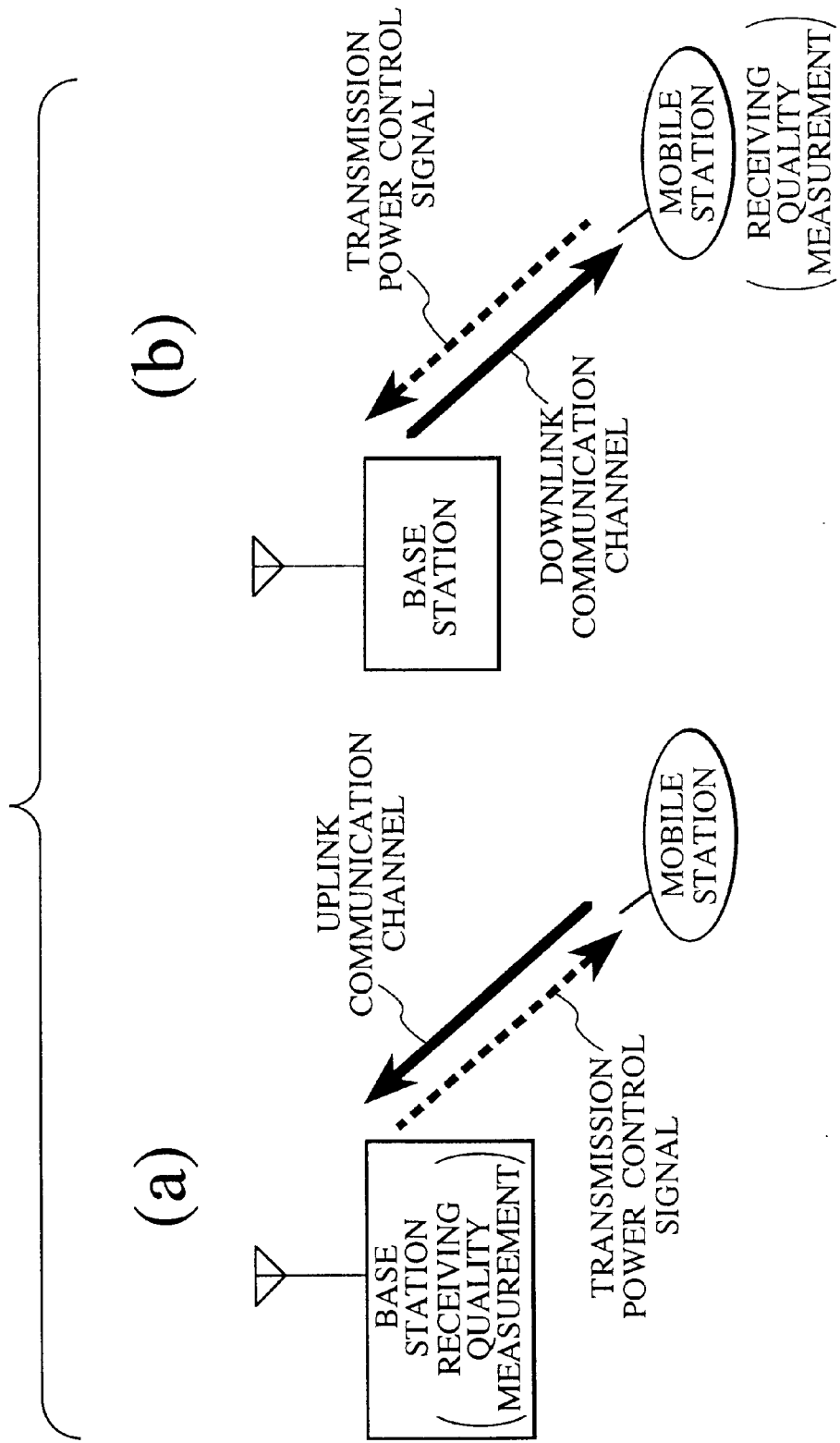
FIG. 1 is a diagram showing a conventional closed loop transmission power control.
Figure 2:
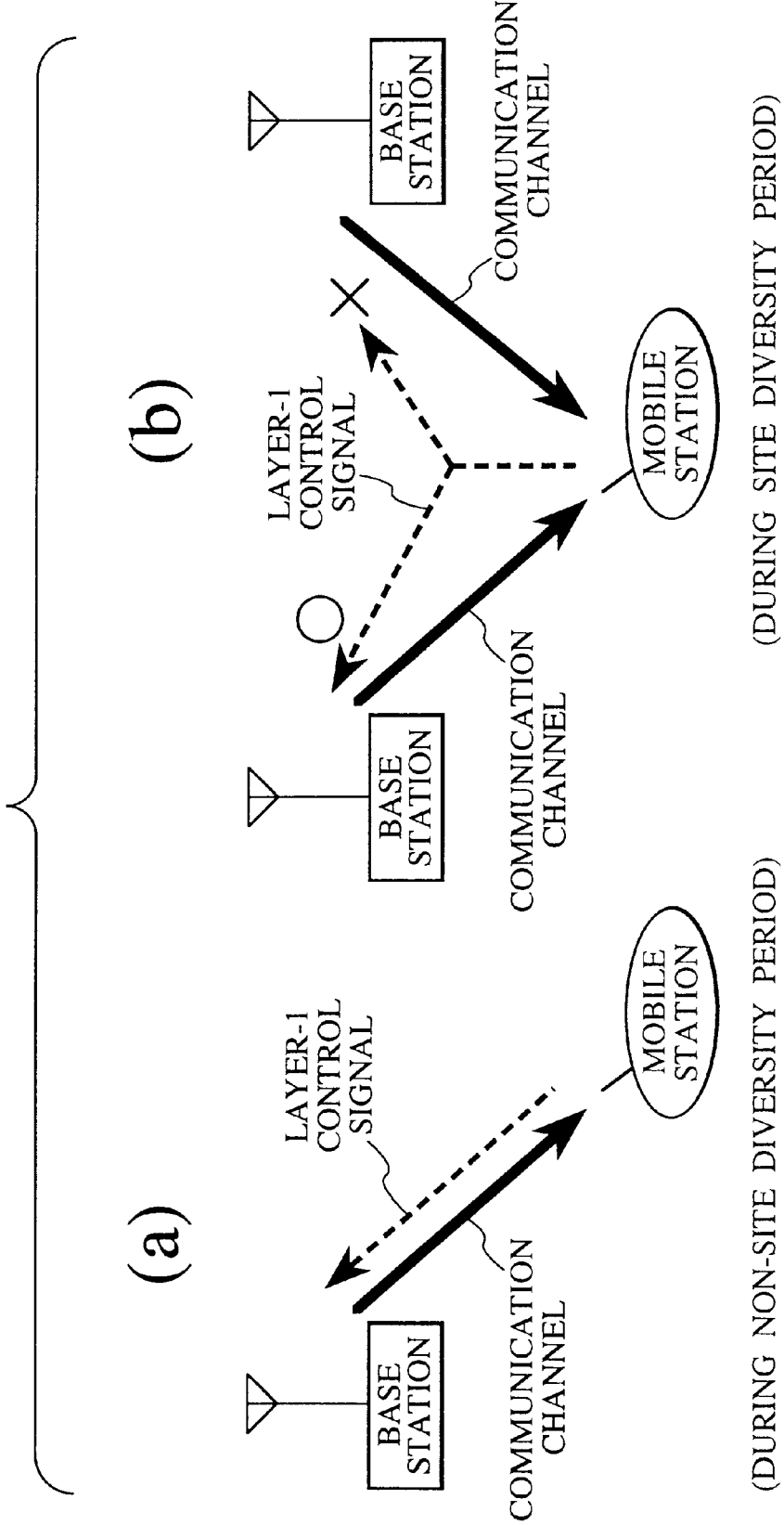
FIG. 2 is a diagram showing a conventional downlink transmission power control using a layer-1 control signal.
Figure 3:
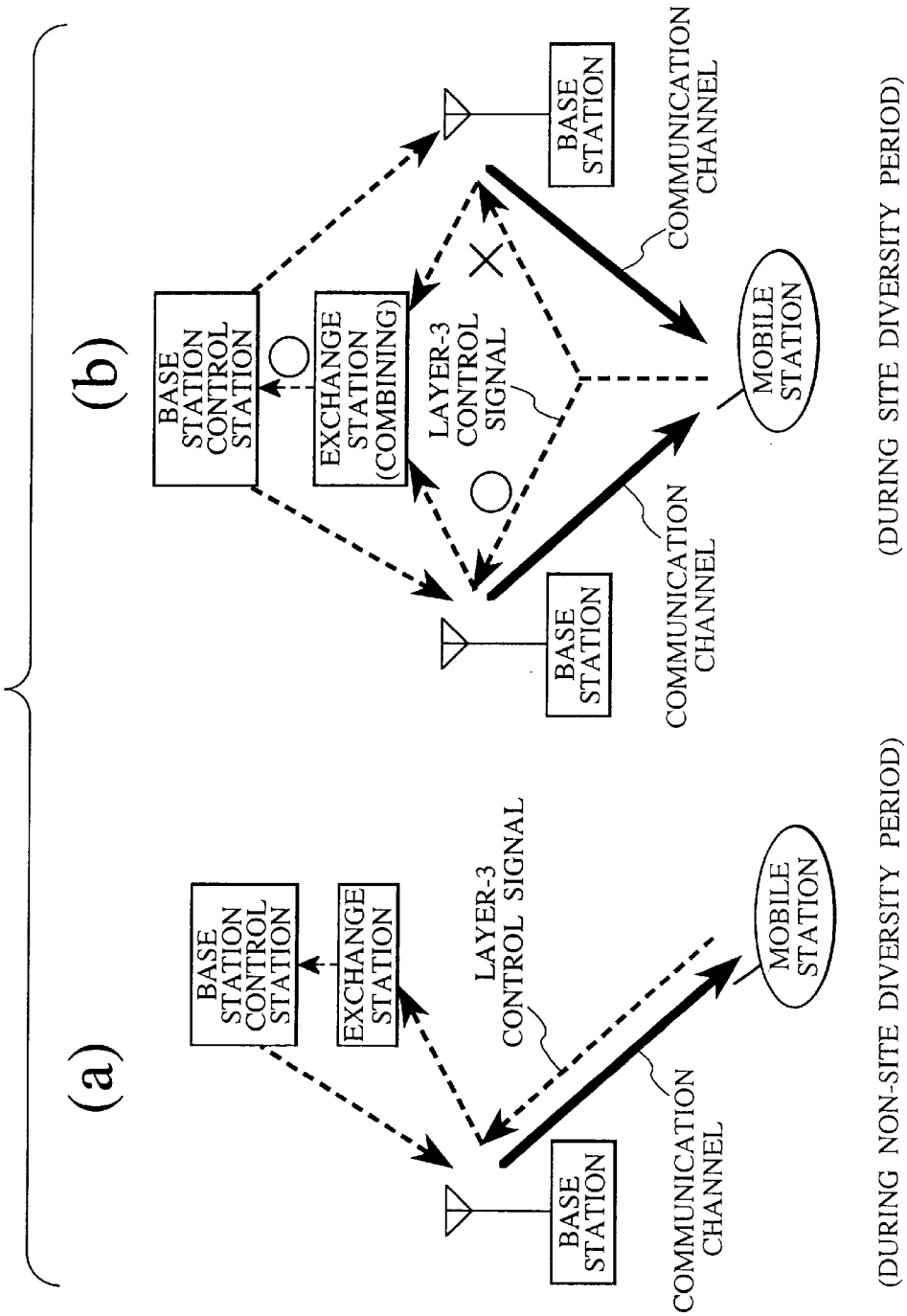
FIG. 3 is a diagram showing a conventional downlink transmission power control using a layer-3 control signal.
Figure 4:
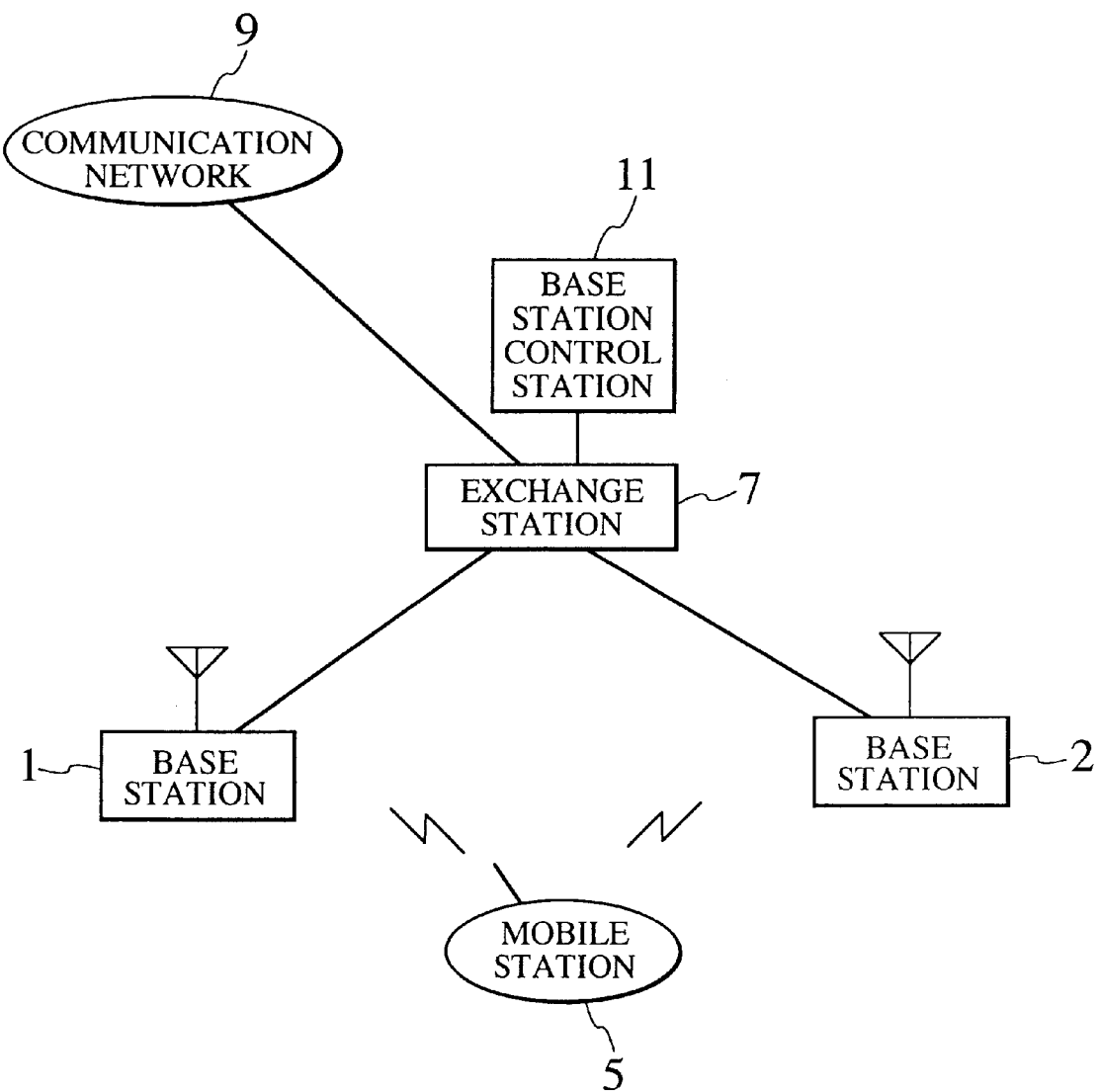
FIG. 4 is a schematic block diagram of a mobile communication system for realizing a downlink transmission power control scheme according to the present invention.

FIG. 4 shows a schematic configuration of a mobile communication system for realizing the downlink transmission power control scheme of the present invention.

In this mobile communication system of FIG. 4, a mobile station 5 is connected with base stations 1 and 2 via radio channels, while the base stations 1 and 2 are connected with a base station control station 11 and a communication network 9 via an exchange station 7. This mobile communication system has a site diversity function so that the mobile station 5 can be simultaneously connected with the plural base stations 1 and 2 by setting up respective radio channels and the diversity combining can be carried out among the plural base stations 1 and 2.

The exchange station 7 has a function for connecting channels from the base stations 1 and 2 with channels from the communication network 9, as well as a function for combining signals received at the plural base stations 1 and 2 and a function for distributing signals from the communication network 9 to the plural base stations 1 and 2 during a site diversity period. The base station control station 11 has a function for controlling the plural base stations 1 and 2.

In this mobile communication system of FIG. 4, in order to maintain communications at the mobile station 5, controls are carried out through radio channels between the mobile station 5 and the base stations 1 and 2. Control signals used in these controls are classified into the layer-1 control signal and the layer-3 control signal. The layer-1 control signal is to be transmitted on layer-1 between the mobile station 5 and the base stations 1 and 2, so that it is terminated at the mobile station 5 and the base stations 1 and 2. The layer-1 control signal is to be used for a fast control so that it is not to be combined at the exchange station 7 even during a site diversity period, and to be received at each base station independently. The layer-3 control signal is to be transmitted on layer-3 between the mobile station 5 and the base station control station 11 via the base stations 1 and 2 and the exchange station 7, so that it is terminated at the mobile station 5 and the base station control station 11.

Figure 5:
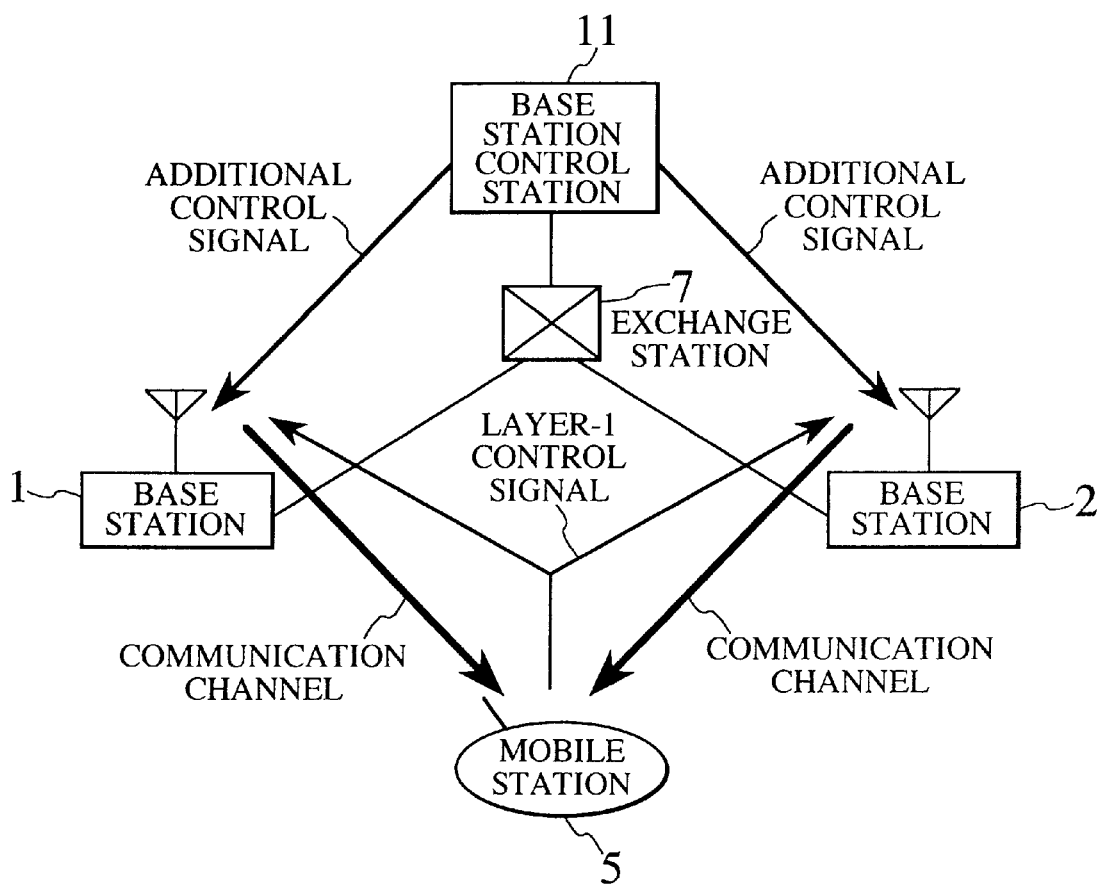
FIG. 5 is a schematic diagram of a mobile communication system showing the most basic embodiment of a downlink transmission power control scheme according to the present invention.
Figure 6:
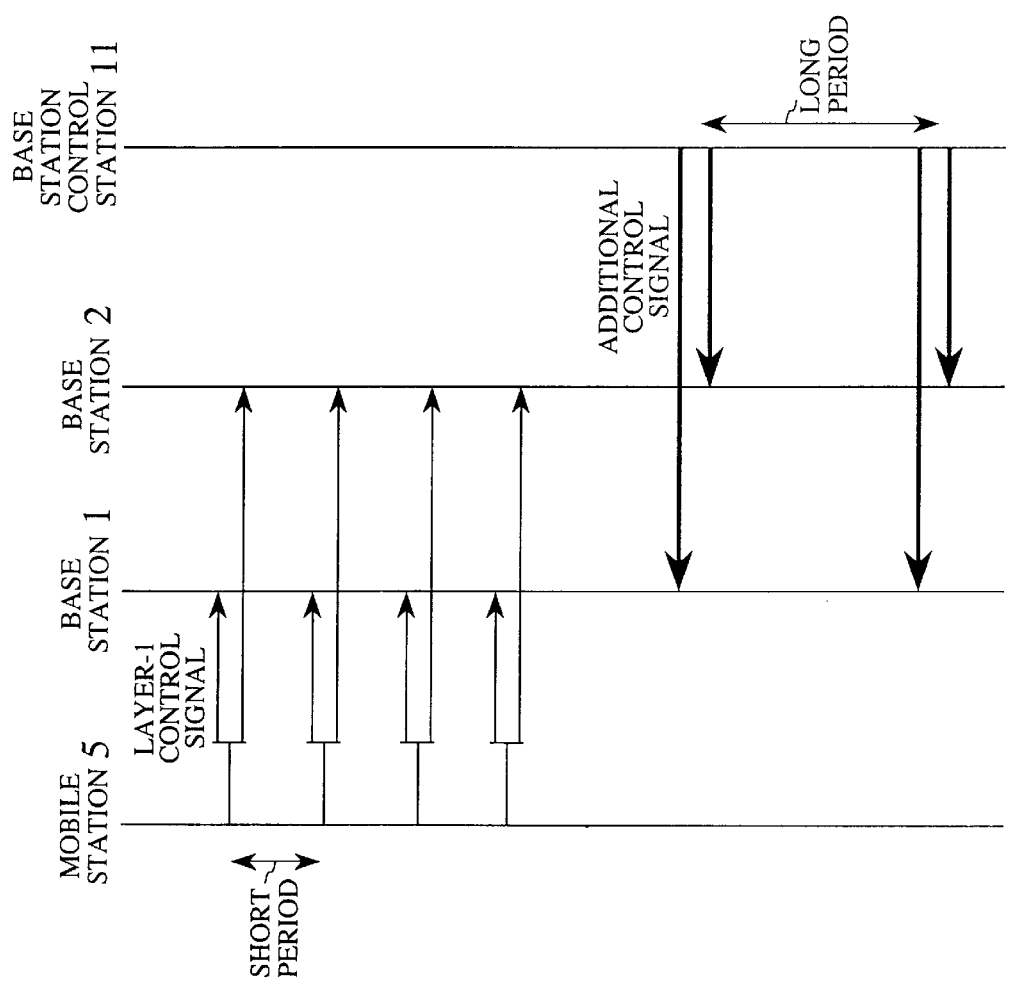
FIG. 6 is a schematic sequence chart showing the most basic embodiment of a downlink transmission power control scheme according to the present invention.
Figure 7:
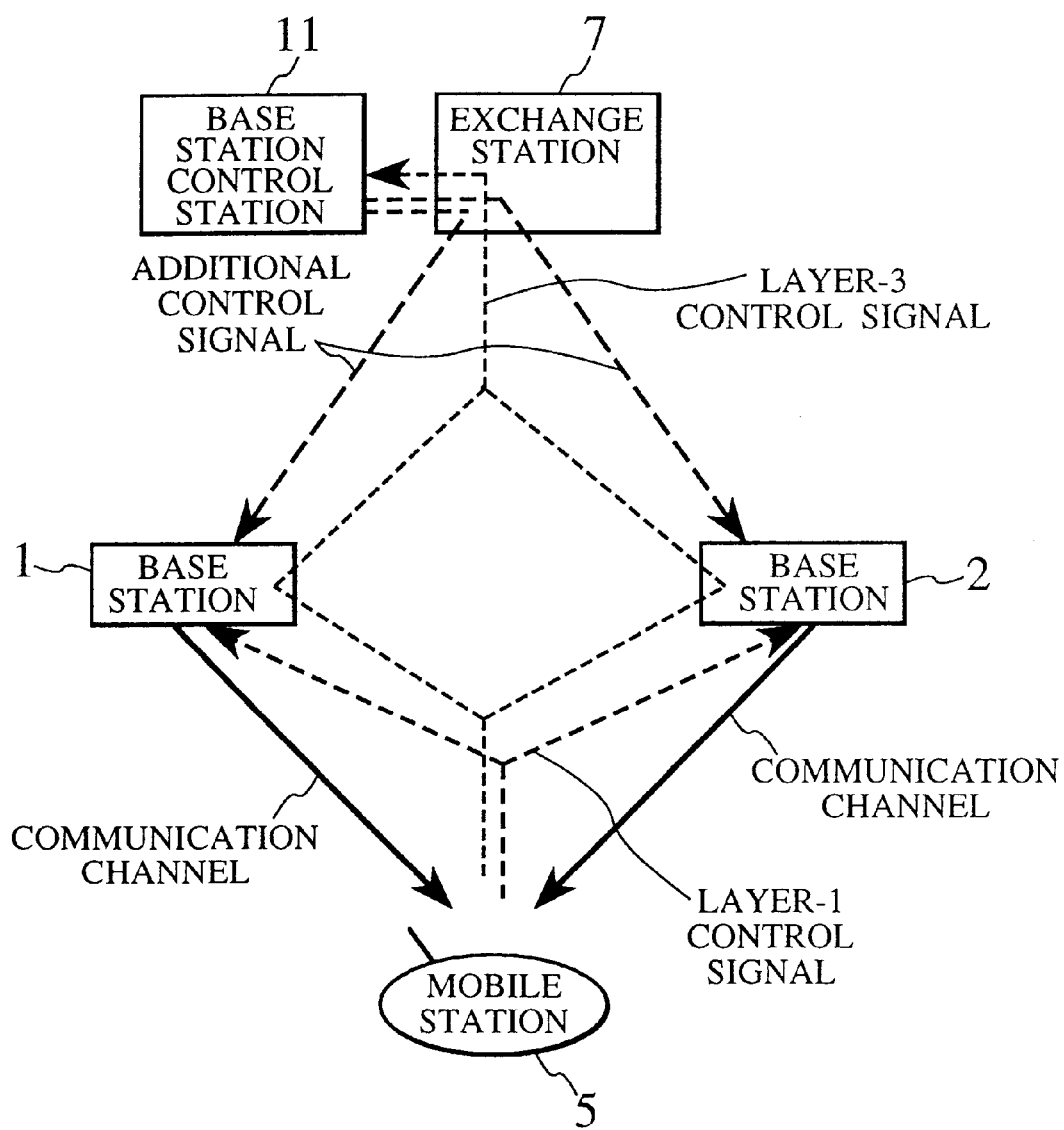
FIG. 7 is a schematic diagram of a mobile communication system showing the first basic embodiment of a downlink transmission power control scheme according to the present invention.
Figure 8:
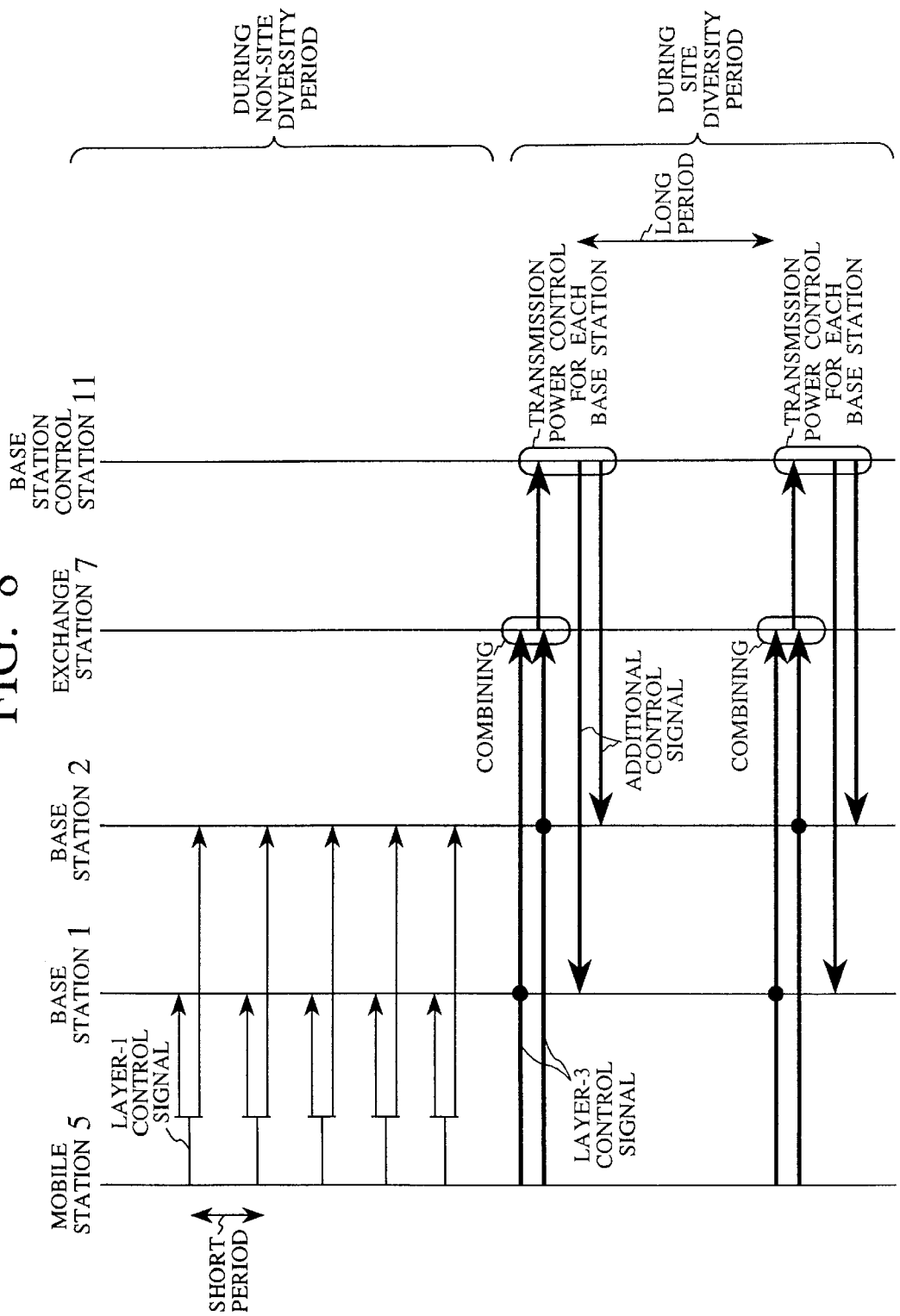
FIG. 8 is a schematic sequence chart showing the second basic embodiment of a downlink transmission power control scheme according to the present invention.
Figure 9:
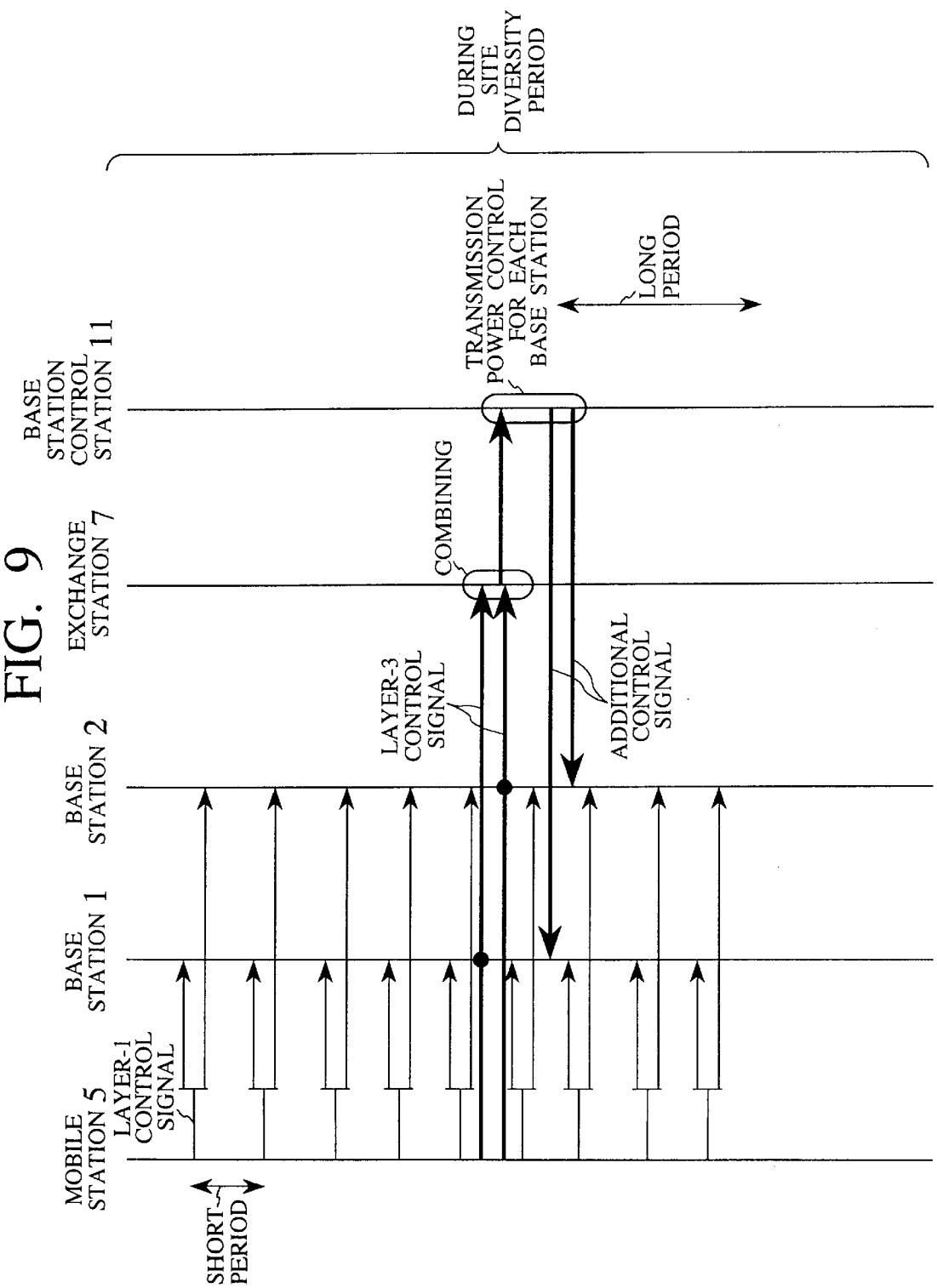
FIG. 9 is a schematic sequence chart showing the third basic embodiment of a downlink transmission power control scheme according to the present invention.
Figure 10:
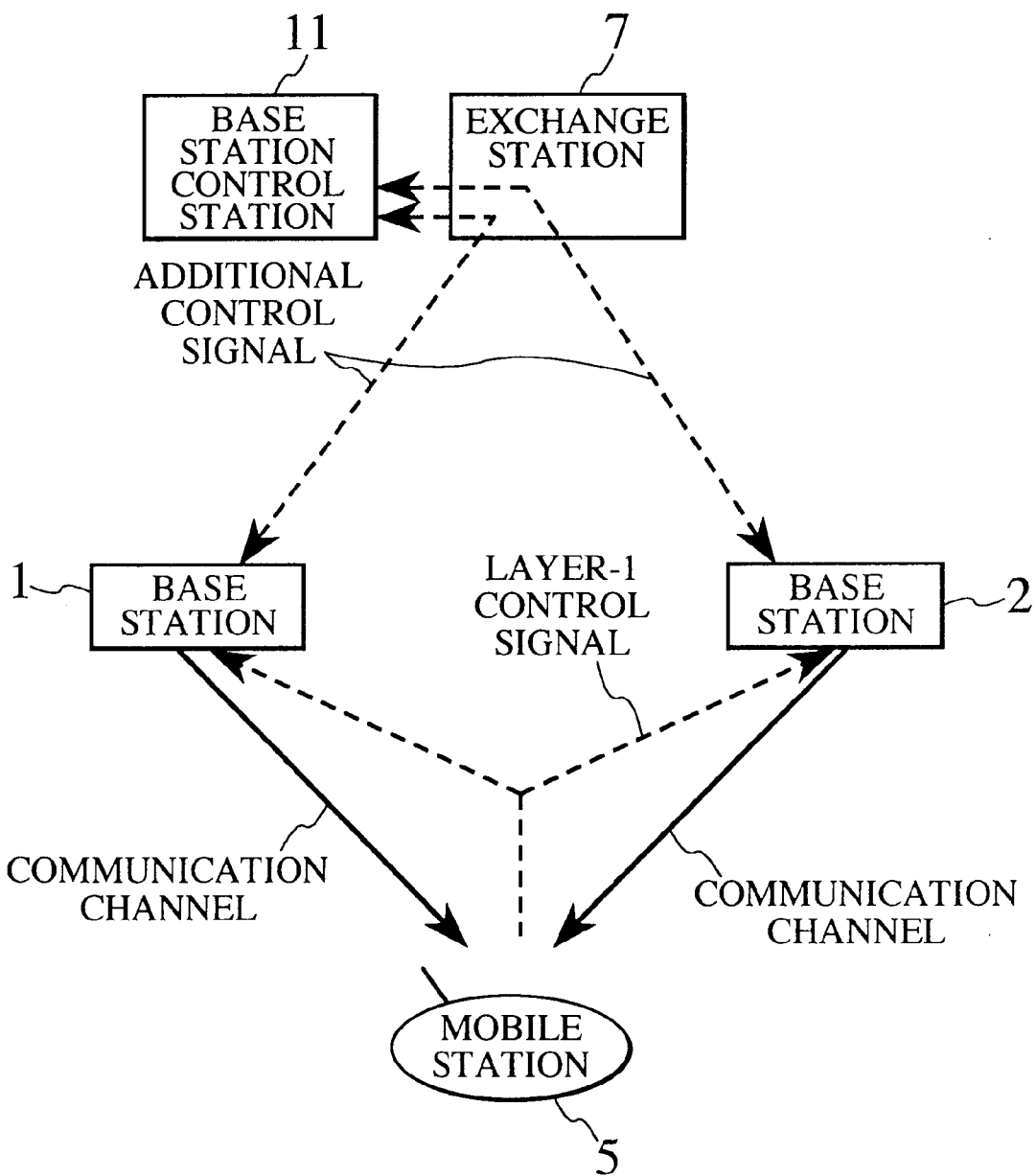
FIG. 10 is a schematic diagram of a mobile communication system showing the fourth basic embodiment of a downlink transmission power control scheme according to the present invention.

In the most basic embodiment, as indicated in FIG. 5 and FIG. 6, the layer-1 control signal which is not to be combined at the exchange station 7 is transmitted from the mobile station 5 to the base stations 1 and 2 in short time intervals so as to realize a fast downlink transmission power control that can follow a variation in the propagation loss.

However, this downlink transmission power control using the layer-1 control signal alone is not capable of realizing an accurate transmission power control for a plurality of base stations 1 and 2 during a site diversity period, and the transmission power error at each base station becomes larger as time elapses.

For this reason, in the most basic embodiment, as indicated in FIG. 5 and FIG. 6, an additional downlink transmission power control is carried out by using additional control signals which are transmitted from the base station control station 11 to the base stations 1 and 2 in certain long time intervals so as to further control the transmission power at each base station.

By means of this combined downlink transmission power control using the layer-1 control signal from the mobile station 5 and the additional control signals from the base station control station 11, it is possible to realize a high downlink transmission power control precision, and therefore it is possible to reduce an amount of interferences and increase a capacity in a case of the CDMA mobile communication system.

As one specific case of the most basic embodiment described above, the first basic embodiment shown in FIG. 7 is further characterized in that the additional control signals transmitted from the base station control station 11 to the base stations 1 and 2 are generated at the base station control station 11, from the layer-3 control signal to be combined at the exchange station 7 which is transmitted from the mobile station 5 to the exchange station 7 via the base stations 1 and 2, combined at the exchange station 7, and supplied from the exchange station 7 to the base station control station 11.

As one specific case of the first basic embodiment described above, the second basic embodiment shown in FIG. 8 is further characterized in that the downlink transmission power control in short time intervals using the layer-1 control signal from the mobile station 5 is carried out during a non-site diversity period, while the downlink transmission power control in long time intervals using the additional control signals from the base station control station 11 based on the layer-3 control signal from the mobile station 5 is carried out during a site diversity period.

As another specific case of the first basic embodiment described above, the third basic embodiment shown in FIG. 9 is further characterized in that the downlink transmission power control in short time intervals using the layer-1 control signal from the mobile station 5 as well as the downlink transmission power control in long time intervals using the additional control signals from the base station control station 11 based on the layer-3 control signal from the mobile station 5 are carried out during a site diversity period.

As another specific case of the basic embodiment described above, the fourth basic embodiment shown in FIG. 10 is further characterized in that the additional control signals transmitted from the base station control station 11 to the base stations 1 and 2 are generated at the base station control station 11, according to a current transmission power control state of each base station based on a report from each base station, so as to realize a centralized downlink transmission power control for all the base stations.

Referring now to FIG. 11 to FIG. 17, a first specific embodiment of a downlink transmission power control scheme for a mobile communication system using the site diversity according to the present invention, which is a more specific based on the first and second basic embodiments described above, will be described in detail.

Figure 11:
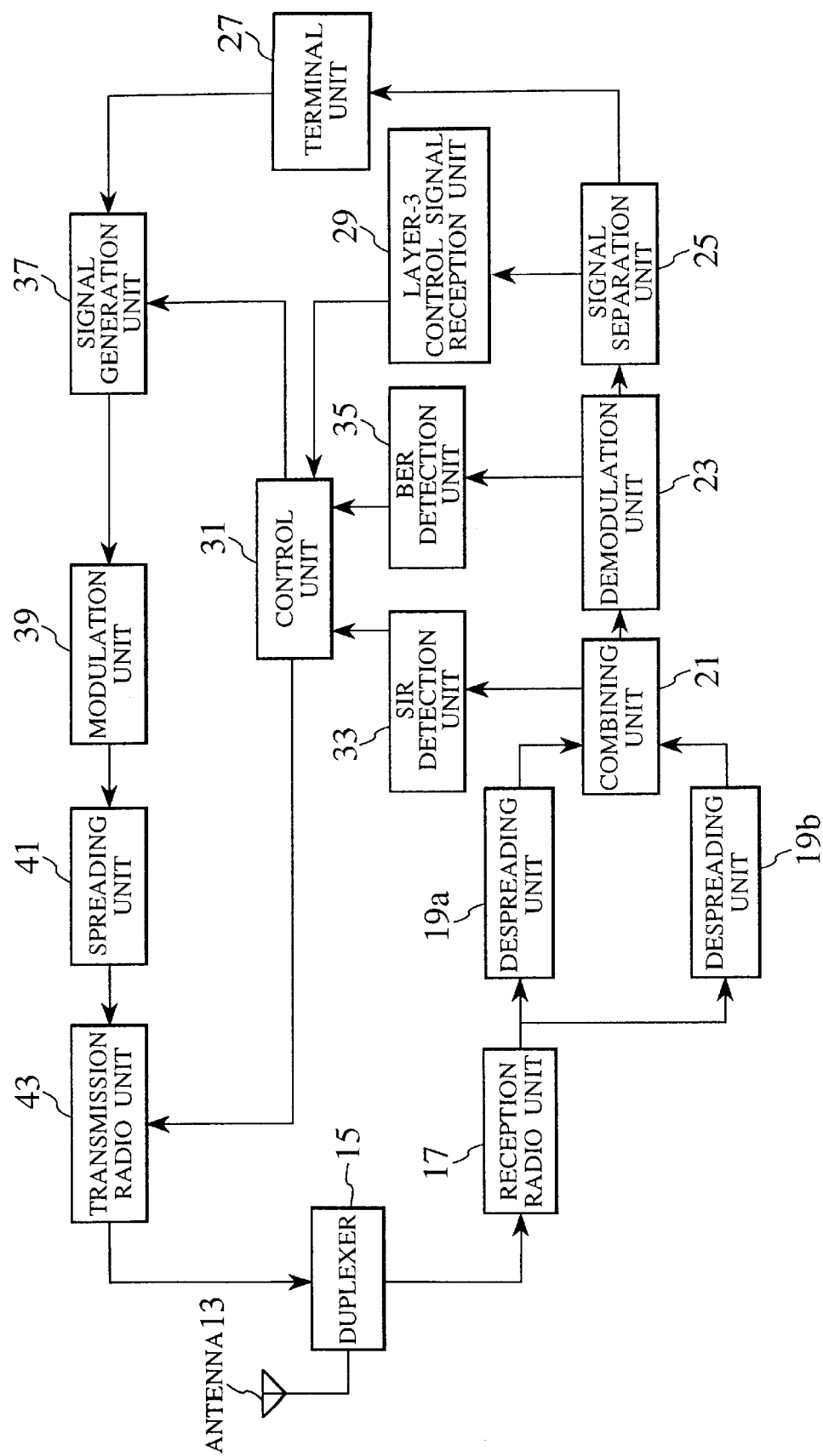
FIG. 11 is a block diagram of a mobile station in the mobile communication system of FIG. 4 according to the first specific embodiment of the present-invention.

FIG. 11 shows a configuration of the mobile station 5 in the system of FIG. 4 according to this first specific embodiment.

In this mobile station configuration of FIG. 11, a duplexer 15 is provided in order to use an antenna 13 for both transmission and reception. Signals-received at a reception radio unit 17 are despread at despreading units 19a and 19b and supplied to a combining unit 21. During a site diversity period, the combining unit 21 combines signals which are despread by using a plurality of codes by the despreading units 19a and 19b, whereas during a nonsite diversity period, only one of the despreading units 19a and 19b despreads the signals and the combining unit 21 does not carry out any combining. A demodulation unit 23 generates a bit sequence from an output of the combining unit 21. A signal separation unit 25 extracts a user data and a layer-3 control signal from an output of the demodulation unit 23, and supplies the user data to a terminal unit 27 while supplying the layer-3 control signal to a layer-3 control signal reception unit 29.

A control unit 31 generates a layer-1 control signal and a layer-3 control signal for the purpose of transmission power control according to a receiving SIR (Signal to Interference Ratio) detected by an SIR detection unit 33 from an output of the demodulation unit 23, a BER (Bit Error Rate) detected by a BER detection unit 35 from an output of the combining unit 21, and the layer-3 control signal received by the layer-3 control signal reception unit 29. A signal generation unit 37 generates transmission signals from the layer-1 control signal and the layer-3 control signal generated by the control unit 31 and the user data supplied from the terminal unit 27. The transmission signals are then modulated by a modulation unit 39, spread by a spreading unit 41, and transmitted to the base stations 1 and 2 from a transmission radio unit 43 via the duplexer 15 and the antenna 13.

Figure 12:
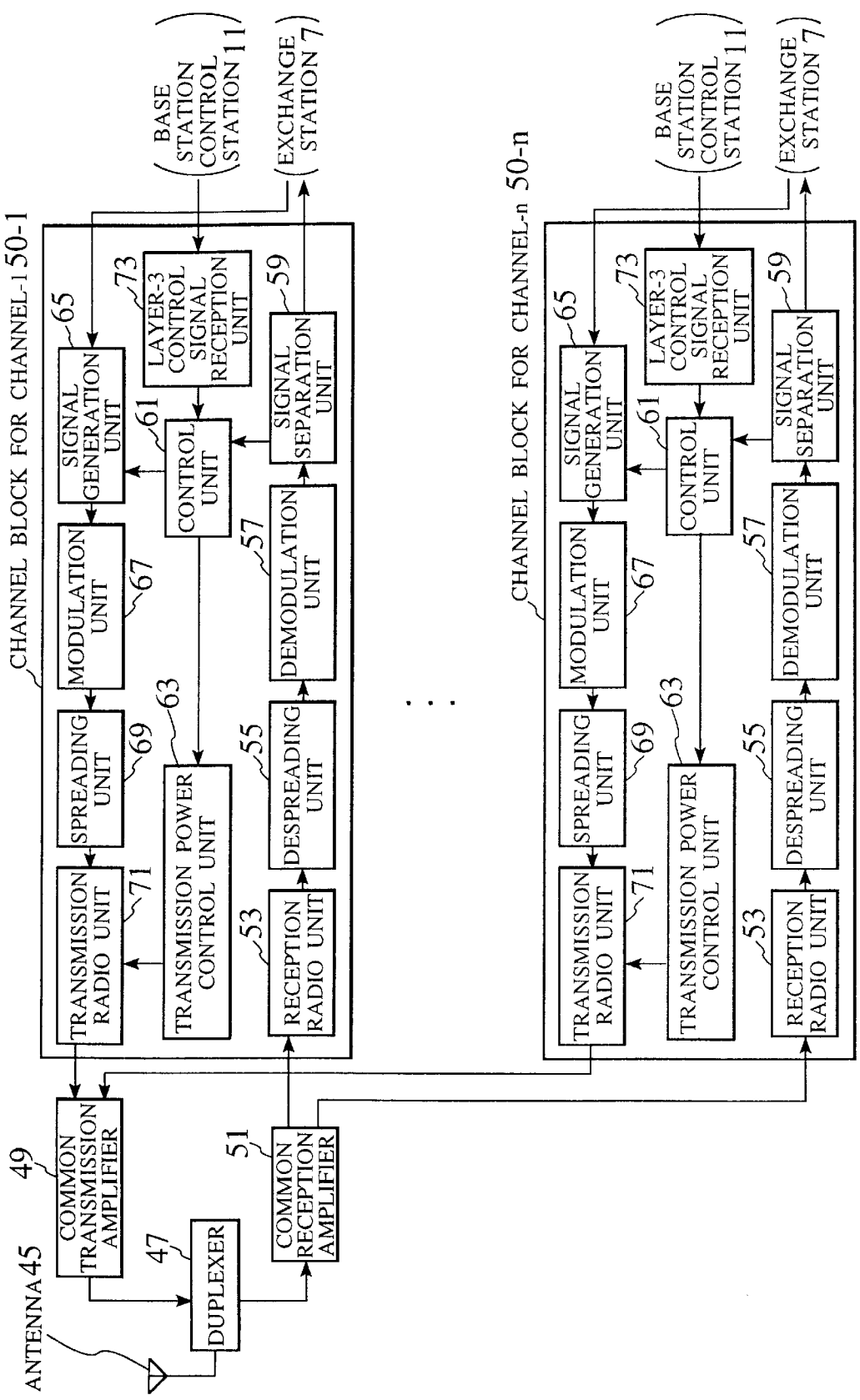
FIG. 12 is a block diagram of a base station in the mobile communication system of FIG. 4 according to the first specific embodiment of the present invention.

FIG. 12 shows a configuration of each one of the base stations 1 and 2 in the system of FIG. 4 according to this first specific embodiment.

In this base station configuration of FIG. 12, a duplexer 47 is provided in order to use an antenna 45 for both transmission and reception. This base station configuration of FIG. 12 has channel-1 to channel-n for the purpose of carrying out communications with a plurality of mobile stations. A common transmission amplifier 49 and a common reception amplifier 51 are to be shared by a plurality of users, and connected with a plurality of channel blocks 50-1 to 50-n corresponding to channel-1 to channel-n. Here, the channel blocks 50-1 to 50-n have an identical internal configuration so that only the channel block 50-1 will be described.

In the channel block 50-1, signals received at a reception radio unit 53 are despread at a despreading unit 55, and then demodulated at a demodulation unit 57 so as to generate a bit sequence. A signal separation unit 59 extracts a user data, a layer-1 control signal, and a layer-3 control signal from an output of the demodulation unit 57, and supplies the user data and the layer-3 control signal to the exchange station 7 while supplying the layer-7 control signal to a control unit 61.

The control unit 61 determines a transmission power according to the layer-1 control signal extracted by the signal separation unit 59 and the layer-3 control signal supplied from the base station control station 11, and specifies the determined transmission power to a transmission radio unit 71 via a transmission power control unit 63. In addition, the control unit 61 relays the layer-3 control signal supplied from the base station control station 11 through a layer-3 control signal reception unit 73 to a signal generation unit 65. The signal generation unit 65 then generates transmission signals from the layer-3 control signal relayed by the control unit 61 and the user data supplied from the exchange station 7. The transmission signals are then modulated by a modulation unit 67, spread by a spreading unit 69, and transmitted to the mobile station 5 from a transmission-radio unit 71 via the common transmission amplifier 49, the duplexer 47, and the antenna 45.

Figure 13:
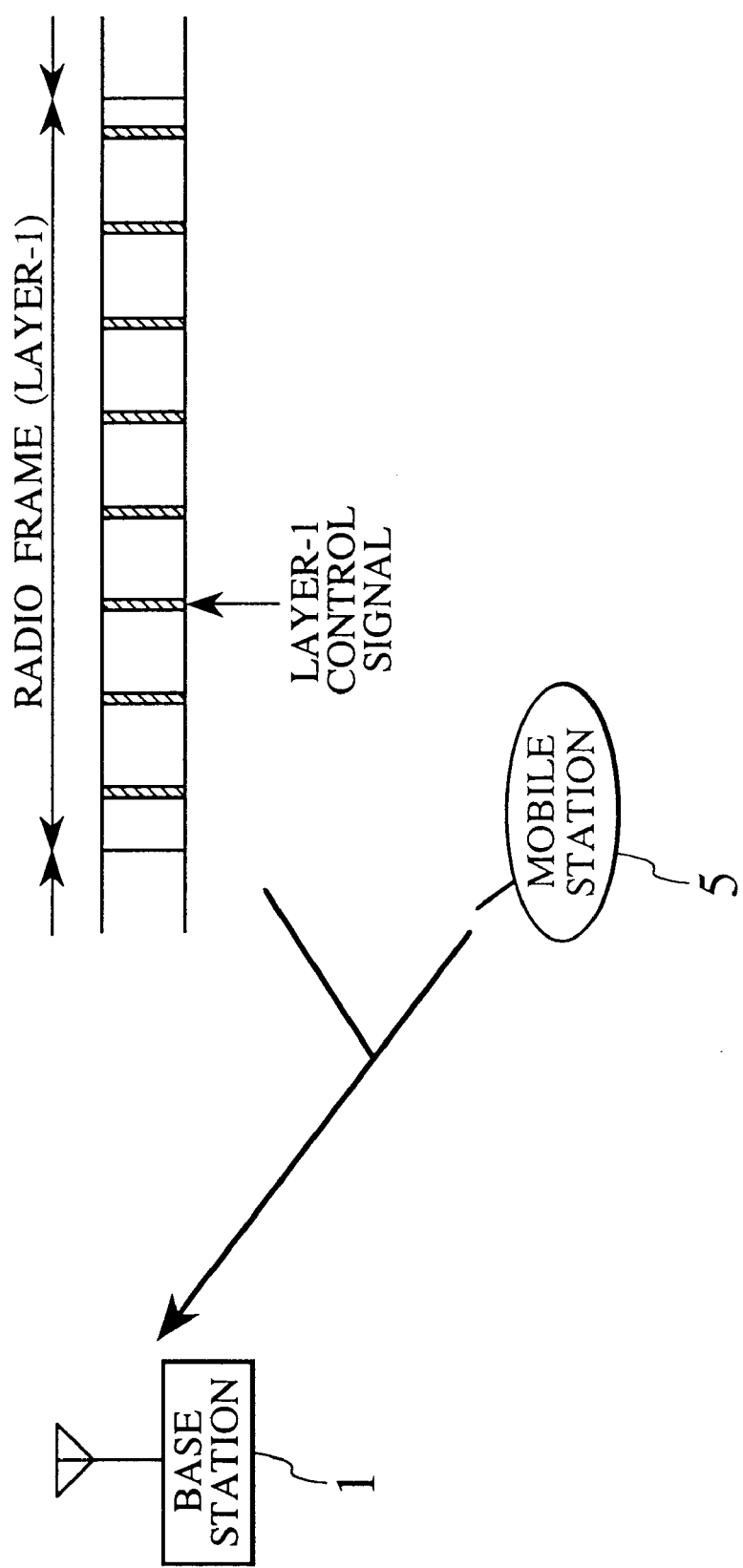
FIG. 13 is a diagram showing an exemplary downlink transmission power control using the layer-1 control signal during the non-site diversity period in the first specific embodiment of the present invention.

FIG. 13 shows an exemplary downlink transmission power control using the layer-1 control signal during the non-site diversity period. In this example shown in FIG. 13, the layer-1 control signal is periodically provided within a radio frame, and the mobile station 5 notifies the receiving quality to the base station 1 by this layer-1 control signal, so as to control the transmission power of the base station 1.

Figure 14:
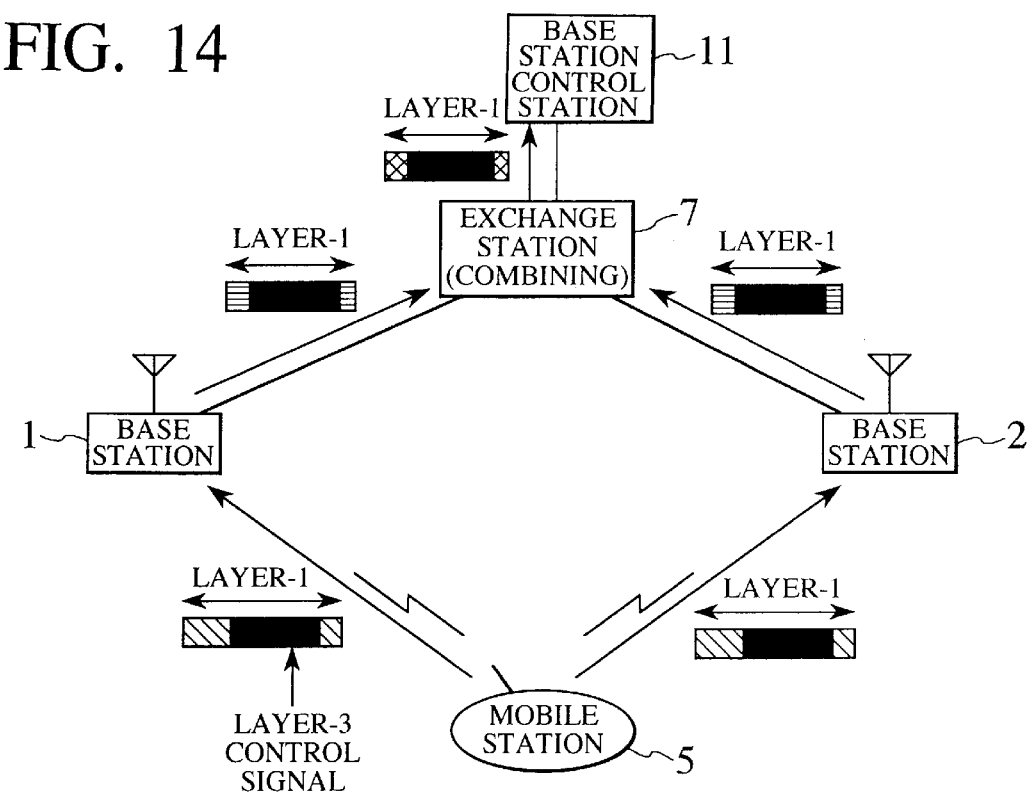
FIG. 14 is a diagram showing one part of an exemplary downlink transmission power control using the layer-3 control signal during the site diversity period in the first specific embodiment of the present invention.
Figure 15:
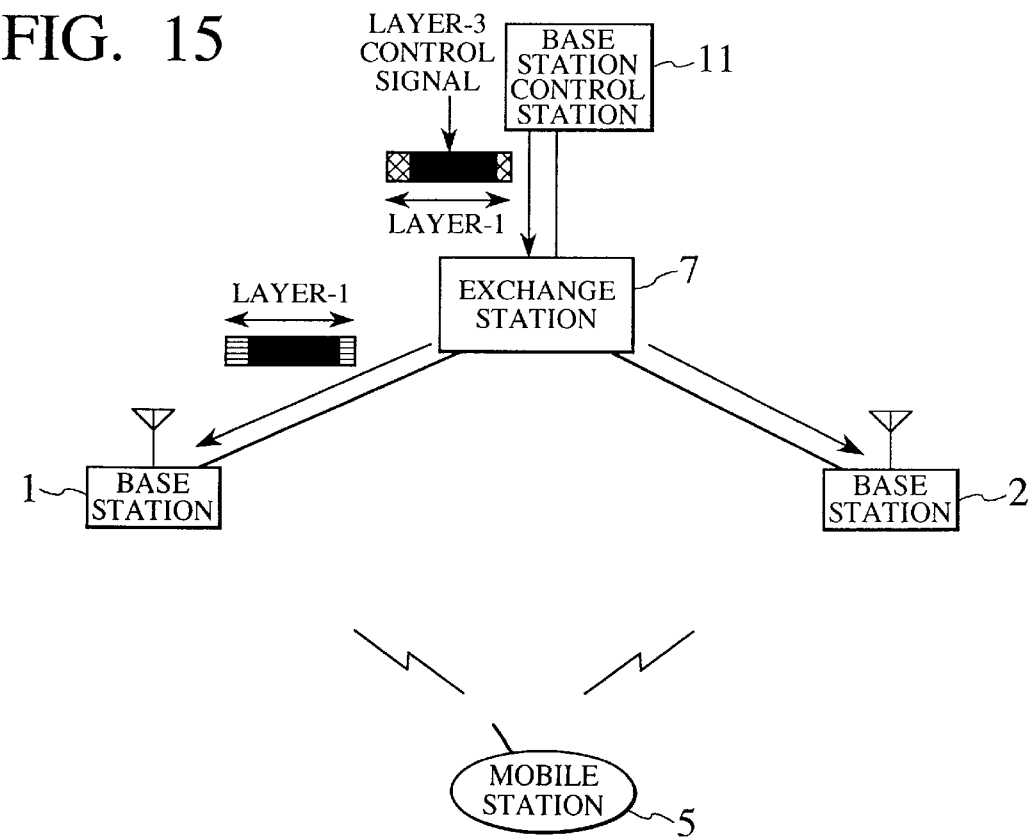
FIG. 15 is a diagram showing another part of an exemplary downlink transmission power control using the layer-3 control signal during the site diversity period in the first specific embodiment of the present invention.

FIG. 14 and FIG. 15 show an exemplary downlink transmission power control using the layer-3 control signal during the site diversity period.

FIG. 14 shows an exemplary case in which the mobile station 5 transmits the layer-3 control signal to the base station control station 11. The same layer-3 control signal transmitted by the mobile station 5 is received by the base station 1 and the base station 2, and respectively transmitted to the exchange station 7. The exchange station 7 carries out the selective combining of the layer-3 control signal received by the base station 1 and the base station 2 which selects one with a better quality, and supplies the selectively combined layer-3 control signal to the base station control station 11. The mobile station 5 notifies the receiving quality to the base station control station 11 by this layer-3 control signal. The base station control station 11 then controls the transmission powers of the base stations 1 and 2 according to the notified receiving quality.

FIG. 15 shows an exemplary case in which the base station control station 11 controls the transmission power of the base station 1 by transmitting the layer-3 control signal to the base station 1 via the exchange station 7.

Figure 16:
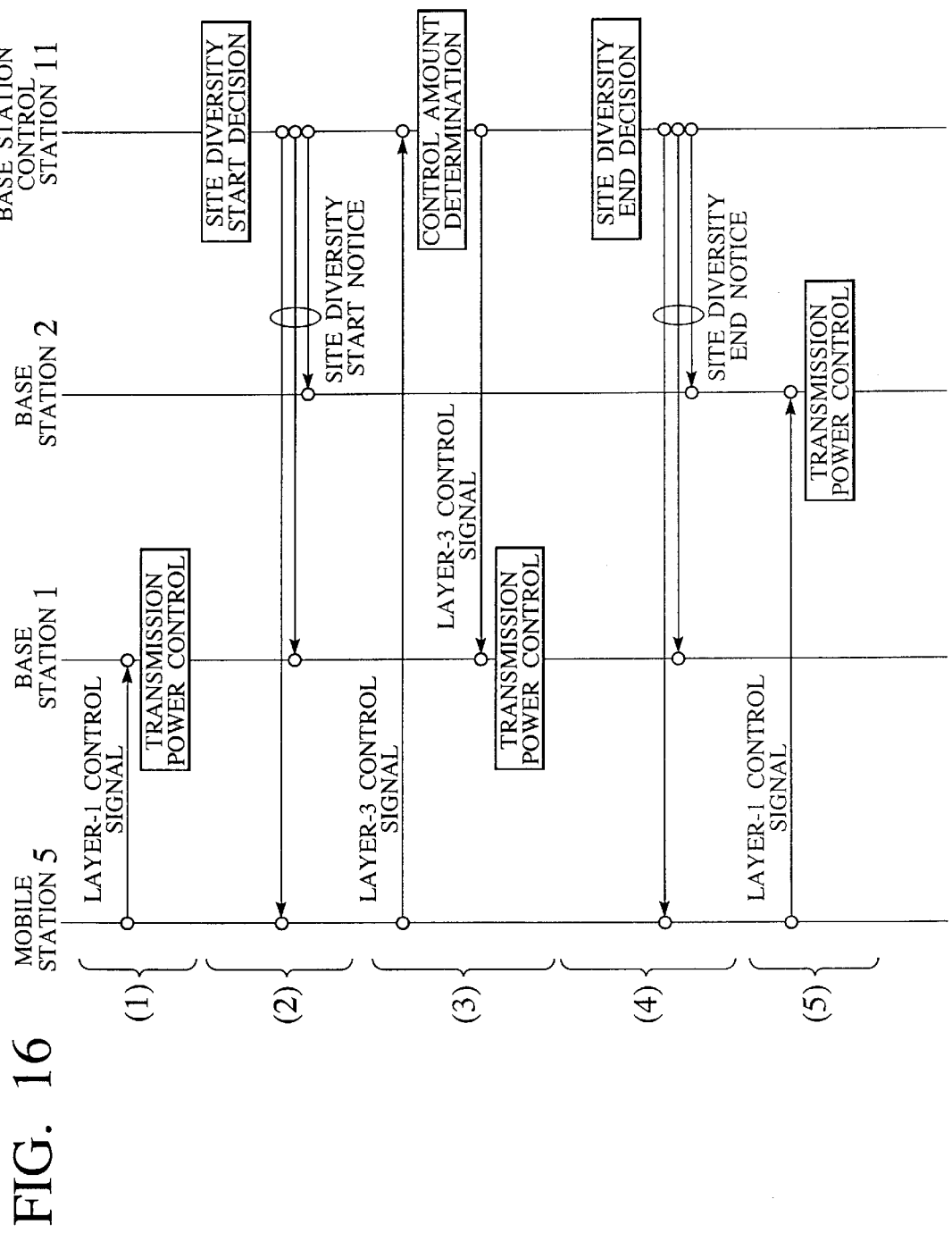
FIG. 16 is a sequence chart showing an exemplary procedure for switching transmission power control modes according to the first specific embodiment of the present invention.

In this first specific embodiment, the transmission power control modes are to be switched according to the site diversity state, and FIG. 16 shows an exemplary procedure for switching transmission power control modes.

In a process (1) of FIG. 16, the mobile station 5 is connected with the base station 1. It is not during the site diversity period at this point, so that the transmission power control using the layer-1 control signal is carried out.

In a process (2) of FIG. 16, the base station control station 11 decides a start of the site diversity, and notifies this decision to the mobile station 5 and the base stations 1 and 2. Each of the mobile station 5 and the base stations 1 and 2 which received this notice then switches the transmission power control using the layer-1 control signal to the transmission power control using the layer-3 control signal.

In a process (3) of FIG. 16, the transmission power control using the layer-3 control signal is carried out, so that the mobile station 5 transmits the layer-3 control signal to the base station control station 11. Then, the base station control station 11 carries out the transmission power control with respect to the base stations 1 and 2 by using the layer-3 control signal.

In a process (4) of FIG. 16, the base station control station 11 decides an end of the site diversity, and notifies this decision to the mobile station 5 and the base stations 1 and 2. Each of the mobile station 5 and the base stations 1 and 2 which received this notice then switches the transmission power control using the layer-3 control signal to the transmission power control using the layer-1 control signal. In this example, the mobile station 5 releases the connection with the base station 1 and is connected only with the base station 2.

In a process (5) of FIG. 16, the transmission power control using the layer-1 control signal is carried out between the mobile station 5 and the base station 2.

In this manner, the downlink transmission power control using the layer-1 control signal is carried out during the non-site diversity period so that the control delay and the control error can be made smaller and an amount of control signals to be transmitted between stations can be reduced. Also, the downlink transmission power control using the layer-3 control signal is carried out during the site diversity period so that the transmission powers of all the base stations can be controlled at high precision. Moreover, by separately using two types of transmission power control methods depending on whether the site diversity is carried out or not in this manner, it is possible to realize the transmission power control with a smaller control error and therefore it is possible to increase a downlink capacity.

Next, an exemplary case of carrying out the transmission power control using the layer-1 control signal according to the receiving SIR and the transmission power control using the layer-3 control signal according to the error rate will be described with reference to FIG. 11.

In the mobile station 5, the control unit 31 can recognizes the site diversity state from the layer-3 control signal received at the layer-3 control signal reception unit 29. When it is not during the site diversity period, the control unit 31 determines the layer-1 control signal from the receiving SIR detected by the SIR detection unit 33, and sends this layer-1 control signal to the signal generation unit 37. For example, the receiving SIR is compared with a reference SIR, and the layer-1 control signal is set to indicate "0" when the receiving SIR is smaller than the reference SIR or "1" otherwise. At the base station which received this layer-1 control signal, the transmission power is raised by one step when the layer-1 control signal indicates "0", or lowered by one step when the layer-1 control signal indicates "1". By carrying out this control continuously, it is possible to maintain the receiving quality at the mobile station nearly constant.

On the other hand, when it is during the site diversity period, the control unit 31 determines the layer-3 control signal from the BER detected by the BER detection unit 35, and sends this layer-3 control signal to the signal generation unit 37. It is also possible to replace the BER detection unit 35 of FIG. 11 with an FER (Frame Error Rate) detection unit, so as to use the FER instead of the BER. Exemplary layer-3 control signal contents are shown in FIG. 17, which vary according to the BER values. The base station control station 11 which received this layer-3 control signal then determines a base station transmission power control amount for each base station according to the notified BER or FER, and notifies the determined control amount to each base station by using the layer-3 control signal. In response, each base station controls its transmission power as commanded by the base station control station 11.

In this example, the transmission power control using the layer-1 control signal is carried out according to the receiving SIR so as to be able to follow an instantaneous variation, while the transmission power control using the layer-3 control signal is carried out according to the bit error rate or the frame error rate so as to reduce an influence of delay time as well as an amount of control signals to be transmitted between stations, so that a transmission power control error can be made smaller and a downlink capacity can be increased.

Next, as another exemplary case, it is also possible to carry out the transmission power control using the layer-1 control signal according to the receiving SIR of the communication channel during the non-site diversity period as in the previous example, while-carrying out the transmission power control using the layer-3 control signal according to a receiving SIR of the perch channel instead of the error rate used in the previous example during the site diversity period.

In this example, the transmission power control based on the receiving SIR is also carried out during the site diversity period so that the BER or FER measurement at the mobile station becomes unnecessary. In addition, it also becomes possible to realize a relatively fast transmission power control during the site diversity period even though the layer-3 control signal is still used.

Next, an exemplary case of carrying out both of the transmission power control using the layer-1 control signal and the transmission power control using the layer-3 control signal according to the bit error rate or frame error rate will be described with reference to FIG. 11.

In the mobile station 5, the control unit 31 can recognizes the site diversity state from the layer-3 control signal received at the layer-3 control signal reception unit 29. When it is not during the site diversity period, the control unit 31 determines the layer-1 control signal from the BER detected by the BER detection unit 35, and sends this layer-1 control signal to the signal generation unit 37. Here, the FER may be used instead of the BER. For example, the detected BER (FER) is compared with a reference BER (FER), and the layer-1 control signal is set to indicate "0" when the detected BER (FER) is smaller than the reference BER (FER) or "1" otherwise. At the base station which received this layer-1 control signal, the transmission power is raised by one step when the layer-1 control signal indicates "0", or lowered by one step when the layer-1 control signal indicates "1". By carrying out this control continuously, it is possible to maintain the receiving quality at the mobile station nearly constant.

On the other hand, when it is during the site diversity period, the control unit 31 determines the layer-3 control signal from the BER detected by the BER detection unit 35, and sends this layer-3 control signal to the signal generation unit 37. Here, the FER may be used instead of the BER similarly. Exemplary layer-3 control signal contents in this case are similar to those shown in FIG. 17. The base station control station 11 which received this layer-3 control signal then determines a base station transmission power control amount for each base station according to the notified BER or FER, and notifies the determined control amount to each base station by using the layer-3 control signal. In response, each base station controls its transmission power as commanded by the base station control station 11.

In this example, both of the transmission power control using the layer-1 control signal and the transmission power control using the layer-3 control signal are carried out according to the bit error rate or frame error rate, so that the measurement of the receiving SIR at the mobile station becomes unnecessary and the switching of measurement procedures at the mobile station also becomes unnecessary. Consequently, the control at the mobile station can be simplified.

Next, an exemplary case of stopping a transmission of a bit for the transmission power control using the layer-1 control signal during the site diversity period will be described with reference to FIG. 11.

In the mobile station 5, the control unit 31 can recognizes the site diversity state from the layer-3 control signal received at the layer-3 control signal reception unit 29. When it is during the site diversity period, the transmission power control using the layer-3 control signal is carried out similarly as in the previous examples, but at this point, the control-unit 31 also commands the transmission radio unit 43 to stop the transmission of a bit corresponding to the layer-1 control signal. In response, the transmission radio unit 43 stops the transmission of the layer-1 control signal alone as commanded by the control unit 31.

In this example, the transmission of a bit for the layer-1 control signal is stopped during the site diversity period, so that an amount of interferences in the uplink channel can be reduced and an uplink capacity can be increased.

Figure 18:
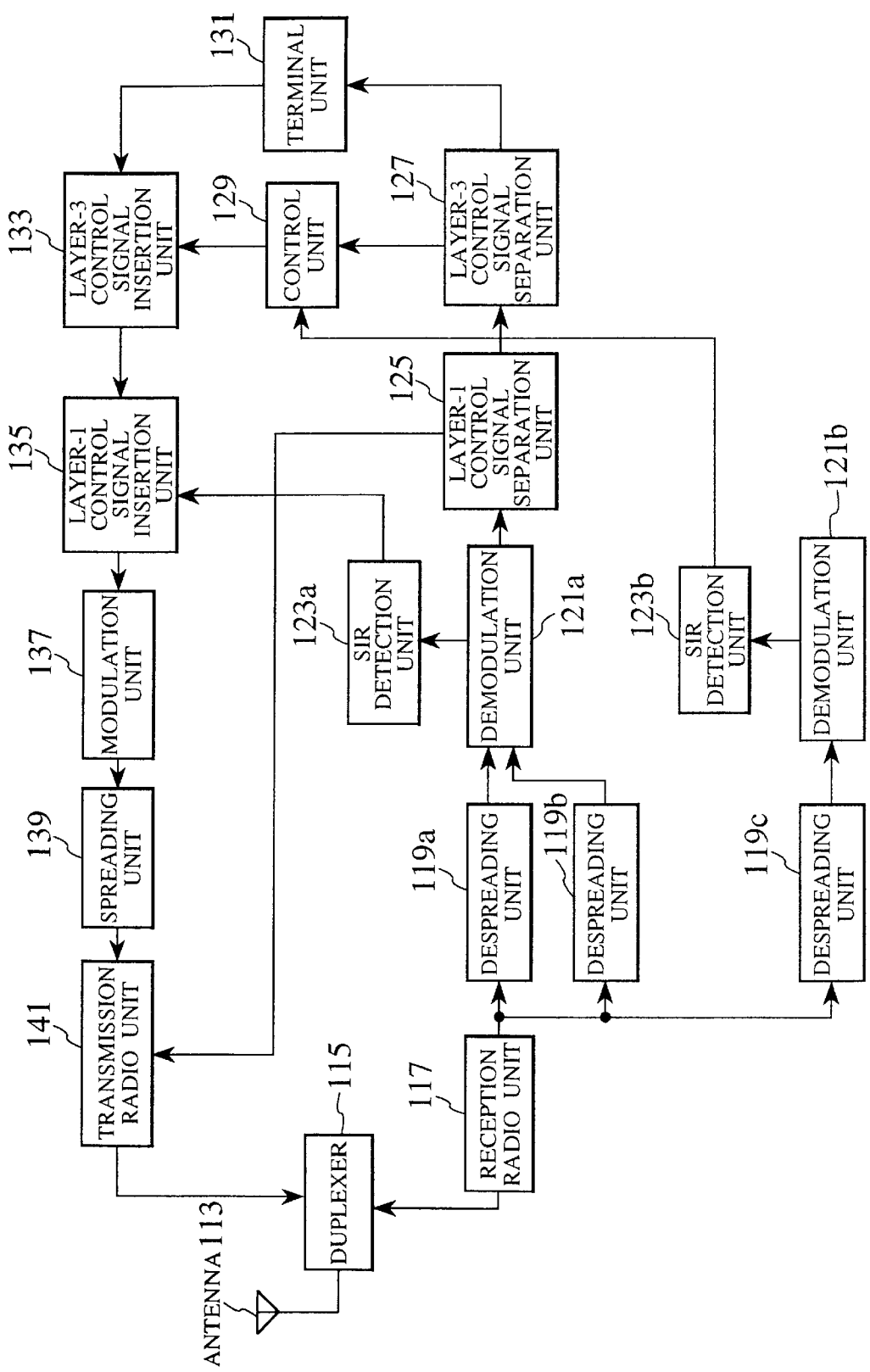
FIG. 18 is a block diagram of a mobile station in the mobile communication system of FIG. 4 according to the second to seventh specific embodiments of the present invention.
Figure 19:
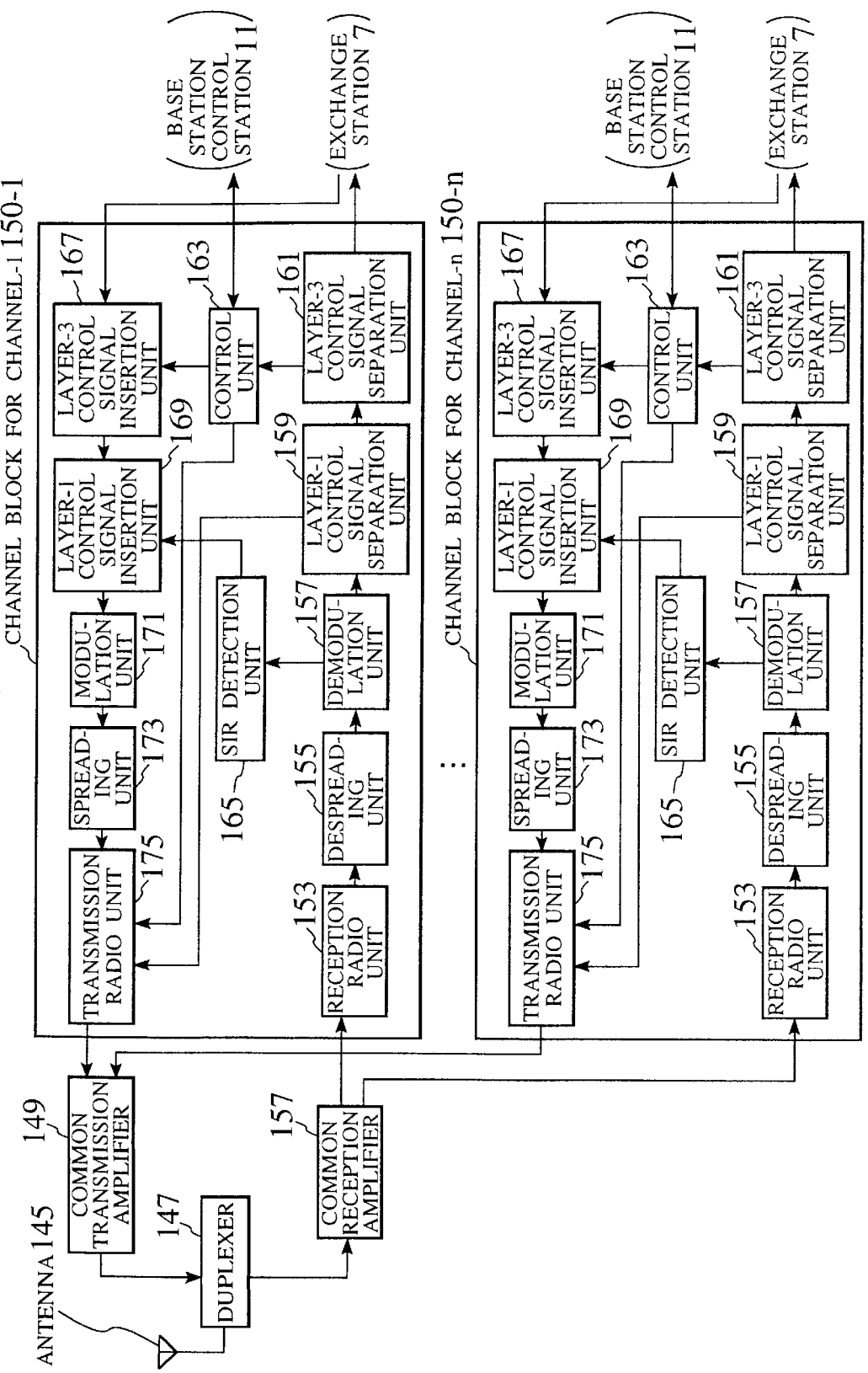
FIG. 19 is a block diagram of a base station in the mobile communication system of FIG. 4 according to the second to seventh specific embodiments of the present invention.
Figure 20:
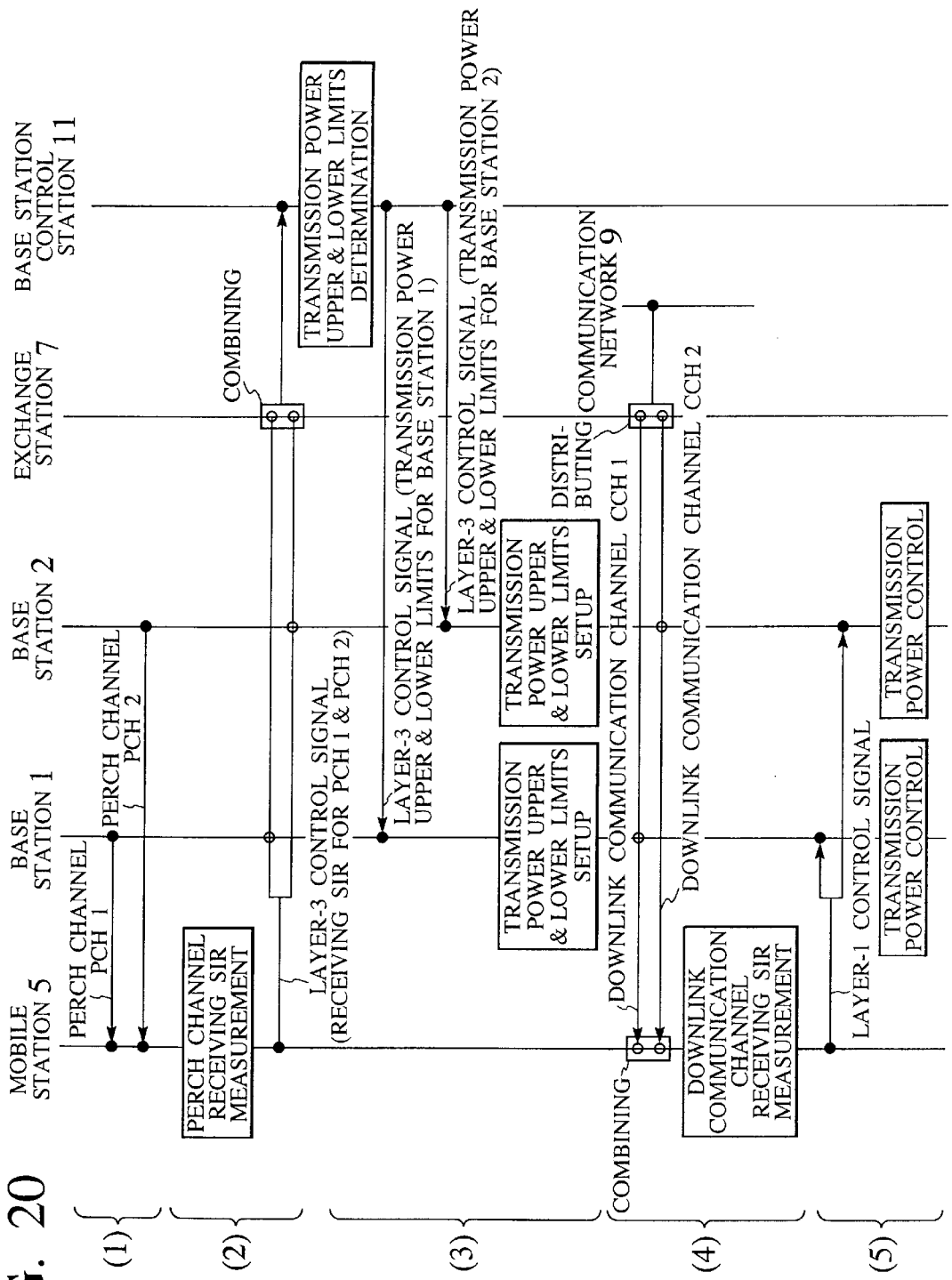
FIG. 20 is a sequence chart showing an exemplary downlink transmission power control procedure in the second specific embodiment of the present invention.

Referring now to FIG. 18 to FIG. 20, a second specific embodiment of a downlink transmission power control scheme for a mobile communication system using the site diversity according to the present invention, which is a more specific embodiment based on the first and third basic embodiments described above, will be described in detail.

FIG. 18 shows a configuration of the mobile station 5 in the system of FIG. 4 according to this second specific embodiment.

In this mobile station configuration of FIG. 18, a duplexer 115 is provided in order to use an antenna 113 for both transmission and reception. Signals received at a reception radio unit 117 are despread by using prescribed codes at a plurality of despreading units 119a, 119b and 119c. During a site diversity period, the despreading unit 119a despreads a downlink communication channel from the base station 1 while the despreading unit 119b despreads a downlink communication channel from the base station 2. The despread signals are then combined at a demodulation unit 121a so as to generate a bit sequence. Also, an SIR detection unit 123a detects a receiving SIR of the communication channel from an output of the demodulation unit 121a, and this detected receiving SIR is used in determining a layer-1 control signal (transmission power control command) to be transmitted to the base stations.

A layer-1 control signal separation unit 125 separates a layer-1 control signal from an output of the demodulation unit 121a, and determines the transmission power at a transmission radio unit 141 according to the separated layer-1 control signal. A layer-3 control signal separation unit 127 separates a layer-3 control signal from an output of the layer-1 control signal separation unit 125, and supplies the separated layer-3 control signal to a control unit 129 while supplying a remaining user data to a terminal unit 131.

In addition, a perch channel that is transmitted from each base station as a control channel for base station selection at the mobile station is despread at the despreading unit 119c and demodulated at a demodulation unit 121b. Then, an SIR detection unit 123b detects a receiving SIR of the perch channel from an output of the demodulation unit 121b. Here, the receiving SIRs for a plurality of perch channels can be detected by receiving them alternately in time.

The control unit 129 carries out a control with respect to the base station control station 11 by using the layer-3 control signal. In addition, the control unit 129 also carries out a control for the purpose of reporting the perch channel receiving SIR detection result to the base station control station 11.

With respect to the user data supplied from the terminal unit 131, a layer-3 control signal insertion unit 133 inserts the layer-3 control signal, and the layer-1 control signal insertion unit 135 inserts the layer-1 control signal so as to generate transmission signals. The transmission signals are then modulated by a modulation unit 137, spread by a spreading unit 139, and transmitted to the base stations 1 and 2 from the transmission radio unit 141 via the duplexer 115 and the antenna 113.

FIG. 19 shows a configuration of each one of the base stations 1 and 2 in the system of FIG. 4 according to this second specific embodiment.

In this base station configuration of FIG. 19, a duplexer 147 is provided in order to use an antenna 145 for both transmission and reception. This base station configuration of FIG. 19 has channel-1 to channel-n for the purpose of carrying out communications with a plurality of mobile stations. A common transmission amplifier 149 and a common reception amplifier 151 are to be shared by a plurality of users, and connected with a plurality of channel blocks 150-1 to 150-n corresponding to channel-1 to channel-n. Here, the channel blocks 150-1 to 150-n have an identical internal configuration so that only the channel block 150-1 will be described.

In the channel block 150-1, signals received at a reception radio unit 153 are despread at a despreading unit 155, and then demodulated at a demodulation unit 157 so as to generate a bit sequence. Also, an SIR detection unit 165 detects a receiving SIR of the communication channel from an output of the demodulation unit 157, and this detected receiving SIR is used in determining a layer-1 control signal (transmission power control command) to be transmitted to the mobile station.

A layer-1 control signal separation unit 159 separates a layer-1 control signal from an output of the demodulation unit 157, and determines the transmission power at a transmission radio unit 175 according to the separated layer-1 control signal. A layer-3 control signal separation unit 161 separates a layer-3 control signal from an output of the layer-1 control signal separation unit 159, and supplies the separated layer-3 control signal to a control unit 163, while supplying a remaining user data to the exchange station 7.

The control unit 163 carries out a-control with respect to the base station control station 11 by using the layer-3 control signal. In addition, the control unit 163 also relays the layer-3 control signal transmitted from the base station control station 11.

With respect to the user data supplied from the exchange station 7, a layer-3 control signal insertion unit 167 inserts the layer-3 control signal, and the layer-1 control signal insertion unit 169 inserts the layer-1 control signal so as to generate transmission signals. The transmission signals are then modulated by a modulation unit 171, spread by a spreading unit 173, and transmitted to the mobile station 5 from the transmission radio unit 175 via the common transmission amplifier 149, the duplexer 147 and the antenna 145.

FIG. 20 shows the downlink transmission power control procedure in this second specific embodiment.

In a process (1) of FIG. 20, the base stations 1 and 2 are transmitting the perch channels PCH1 and PCH2.

In a process (2) of FIG. 20, the mobile station 5 measures the receiving SIRs of the perch channels PCH1 and PCH2, and reports these measured receiving SIRs to the base station control station 11 by using the layer-3 control signal. Here, the layer-3 control signal is combined at the exchange station 7, so that the base station control station 11 can receive the layer-3 control signal in good quality even when the receiving quality at one base station is poor. The base station control station 11 also always has the perch channel transmission powers at the base stations 1 and 2 as well as a target receiving SIR of the downlink communication channel at the mobile station 5.

In a process (3) of FIG. 20, the base station control station 11 determines upper and lower limits of the transmission power at each base station. Here, the upper and lower limits of the transmission power can be determined according to the following calculation, for example.

$$UL1(dBm)=TP1(dBm)-PSIR1(dB)+MSIR\ (dB)+\alpha(dB)$$

$$DL1(dBm)=TP1(dBm)-PSIR1(dB)+MSIR\ (dB)-\beta(dB)$$

$$UL2(dBm)=TP2(dBm)-PSIR2(dB)+MSIR\ (dB)+\alpha(dB)$$

$$DL2(dBm)=TP2(dBm)-PSIR2(dB)+MSIR\ (dB)-\beta(dB)$$

where:

UL1: the upper limit of the transmission power at the base station 1,

UL2: the upper limit of the transmission power at the base station 2,

DL1: the lower limit of the transmission power at the base station 1,

DL2: the lower limit of the transmission power at the base station 2,

TP1: the transmission power of the perch channel PCH1,

TP2: the transmission power of the perch channel PCH2,

PSIR1: the receiving SIR of the perch channel PCH1,

PSIR2: the receiving SIR of the perch channel PCH2,

MSIR: the target receiving SIR of the downlink communication channel at the mobile station, and $\alpha+\beta$: a control range of the transmission power.

According to this determination method, the receiving SIR at the mobile station of the downlink communication channel transmitted from each base station becomes a value close to the target receiving SIR.

The base station control station 11 then notifies the respective upper and lower limits of the base station transmission power determined in this manner to each of the base stations 1 and 2 by using the layer-3 control signals, so that each base station sets up the respective upper and lower limits of the transmission power therein.

In a process (4) of FIG. 20, the mobile station 5 combines the downlink communication channels CCH1 and CCH2 originating from the communication network 9, distributed by the exchange station 7 and transmitted through the base stations 1 and 2, and measures the receiving SIR of the combined downlink communication channel.

In a process (5) of FIG. 5, the mobile station determines the layer-1 control signal (transmission power control command) according to the measured receiving SIR, and transmits the layer-1 control signal to the base stations 1 and 2. At each base station, the transmission power is controlled according to the layer-1 control signal from the mobile station, but only within a range within the upper and lower limits of the transmission power set up in the process (3) described above.

By carrying out such a control during the site diversity period, the base station transmission power can be controlled within a range of $\alpha+\beta$ (dB) in accordance with a variation of the propagation loss between the mobile station and the base station, and an error can be suppressed below a prescribed level even when there is an error in the layer-1 control signal (transmission power control command).

Consequently, even in a case of carrying out the transmission power control using the layer-1 control signal transmitted between the mobile station and the base station during the site diversity period, the upper and lower limits for the transmission power of each base station are set up according to the propagation loss by using the high quality layer-3 control signal, so that it is possible to realize the fast downlink transmission power control using the layer-1 control signal which is terminated between the mobile station and the base station, with only a small transmission power control error due to the transmission error of the layer-1 control signal, and therefore it is possible to increase a capacity in a case of the CDMA mobile communication system.

Figure 21:
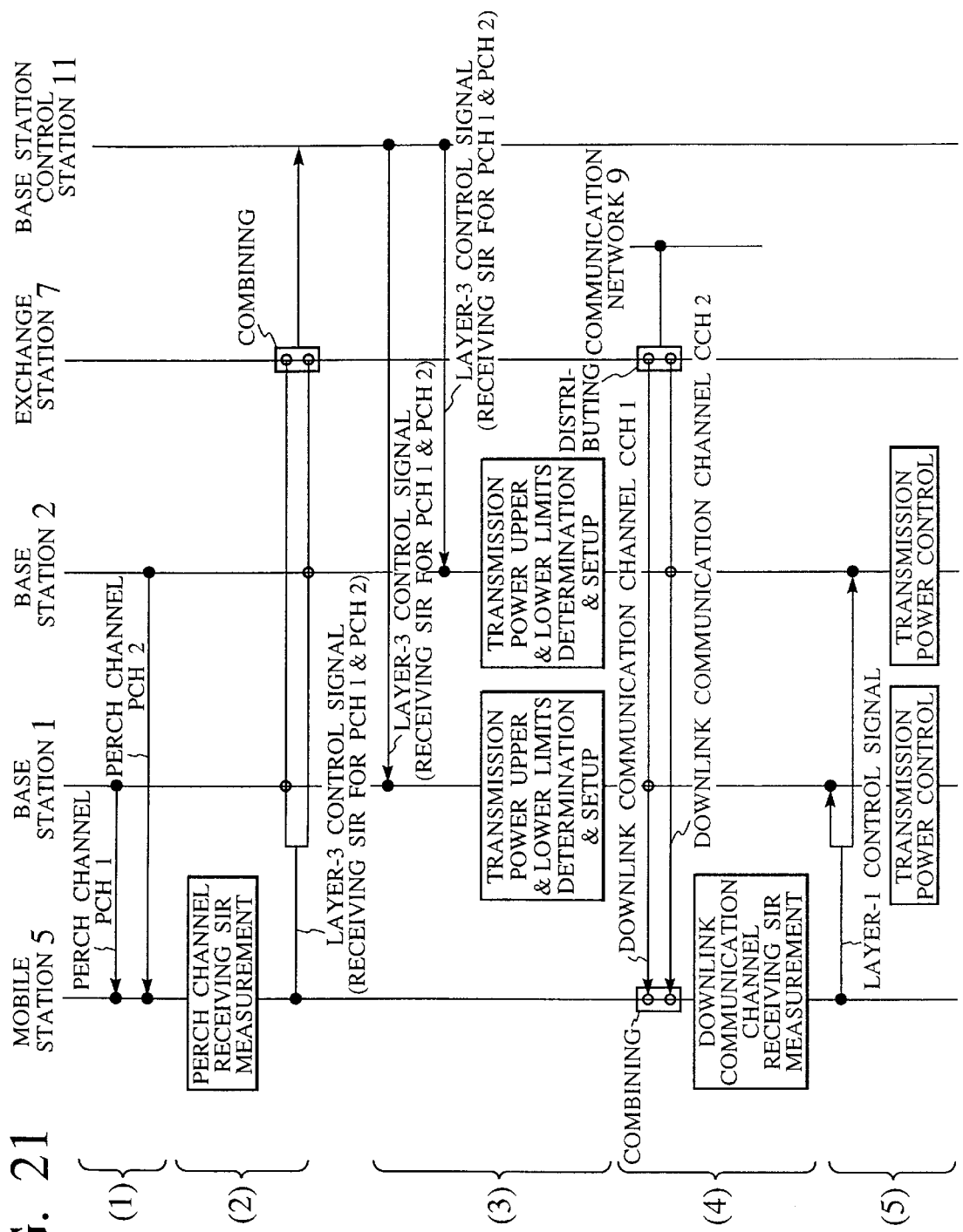
FIG. 21 is a sequence chart showing an exemplary downlink transmission power control procedure in the third specific embodiment of the present invention.

Referring now to FIG. 21, a third specific embodiment of a downlink transmission power control scheme for a mobile communication system using the site diversity according to the present invention, which is another more specific embodiment based on the first and third basic embodiments described above, will be described in detail.

In contrast to the second specific embodiment described above which is directed to a case of determining the upper and lower limits for the transmission powers of the base stations 1 and 2 at the base station control station 11 during the site diversity period, this third specific embodiment is directed to a case of determining the upper and lower limits for the transmission power of each base station at each base station during the site diversity period. In this third specific embodiment, the configurations of the mobile station and the base station are substantially similar to those of FIG. 18 and FIG. 19 described above.

FIG. 21 shows the downlink transmission power control procedure in this third specific embodiment.

In FIG. 21, the processes (1) and (2) up to a point where the mobile station 5 reports the measured receiving SIRs to the base station control station 11 are the same as in the second specific embodiment.

In a process (3) of FIG. 21, when the receiving SIRs of the perch channels PCH1 and PCH2 are received, the base station control station 11 notifies these receiving SIRs to each one of the base stations 1 and 2 by using the layer-3 control signals. Here, each base station also always has a target receiving SIR of the downlink communication channel at the mobile station 5, and determines and sets up the upper and lower limits of the transmission power at that base station by the same calculation as used in the second specific embodiment. Thereafter, the processes (4) and (5) of FIG. 21 are the same as in the second specific embodiment.

According to this downlink transmission power control procedure of FIG. 21, it is also possible to realize the fast downlink transmission power control using the layer-1 control signal which is terminated between the mobile station and the base station, with only a small transmission power control error due to the transmission error of the layer-1 control signal, and therefore it is also possible to increase a capacity in a case of the CDMA mobile communication system, similarly as in the second specific embodiment.

In addition, there is no need to manage the transmission power of each base station at the base station control station 11, and the downlink transmission power can be controlled independently at each base station, so that there is an advantage that the control load can be dispersed. In particular, in a system in which the transmission power of the perch channel is to be changed frequently, it is possible to reduce the control traffic because there is no need to notify the perch channel transmission power to the base station control station 11 every time the perch channel transmission power is changed.

It is to be noted that, in FIG. 21, the base station control station 11 sends the receiving SIRs of the perch channels PCH1 and PCH2 as received from the mobile station 5 to both of the base stations 1 and 2, but the base station control station 11 may send the receiving SIR of the perch channel PCH 1 alone to the base station 1 and the receiving SIR of the perch channel PCH2 alone to the base station 2, if desired.

Next, a fourth specific embodiment of a downlink transmission power control scheme for a mobile communication system using the site diversity according to the present invention, which is another more specific embodiment based on the first and third basic embodiments described above, will be described in detail.

This fourth specific embodiment is directed to a case of determining the upper and lower limits for the transmission powers of all the base station that are simultaneously connected, by using the perch channel receiving SIR of one base station for which the propagation loss with respect to the mobile station is smallest, during the site diversity period. In this fourth specific embodiment, the configurations of the mobile station and the base station are substantially similar to those of FIG. 18 and FIG. 19 described above.

In this fourth specific embodiment, a value [TP1 (dBm) −PSIR1 (dB)] and a value [TP2 (dBm)−PSIR2 (dB)] are compared, and the base station having the smaller one of these values can be judged as having the smallest propagation loss among the two base stations. When the base station 1 has the smallest propagation loss with respect to the mobile station 5, for example, the upper and lower limits of the transmission power at each base station can be determined according to the following calculation, for example.

$UL1(dBm)=TP1(dBm)-PSIR1(dB)+MSIR(dB)+\alpha(dB)$ $DL1(dBm)=TP1(dBm)-PSIR1(dB)+MSIR(dB)-\beta(dB)$ $UL2(dBm)=TP1(dBm)-PSIR1(dB)+MSIR(dB)+\alpha(dB)$ $DL2(dBm)=TP1(dBm)-PSIR1(dB)+MSIR(dB)-\beta(dB)$ where:

UL1: the upper limit of the transmission power at the base station 1,

UL2: the upper limit of the transmission power at the base station 2,

DL1: the lower limit of the transmission power at the base station 1,

DL2: the lower limit of the transmission power at the base station 2,

TP1: the transmission power of the perch channel PCH1,

PSIR1: the receiving SIR of the perch channel PCH1,

MSIR: the target receiving SIR of the downlink communication channel at the mobile station, and $\alpha+\beta$: a control range of the transmission power.

According to this determination method, the upper and lower limits of the transmission powers at the base stations 1 and 2 are identical.

In this fourth specific embodiment, the transmission power of each base station is controlled similarly as in the previous specific embodiments, but the transmission powers of the base stations 1 and 2 are both confined within the same range, so that the transmission powers of the base stations can be maintained at nearly the same level within a prescribed precision range.

Here, the receiving SIR at the mobile station of the downlink communication channel transmitted from the base station 1 becomes a value close to the target receiving SIR in this example. On the other hand, the receiving SIR at the mobile station of the downlink communication channel transmitted from the base station 2 becomes a value smaller than the target receiving SIR, but the receiving SIR after the combining of two communication channels at the mobile station can still satisfy the target receiving SIR. In this case, the transmission power from the base station 2 which has a larger propagation loss with respect to the mobile station will not be made excessively high, so that the amount of interferences can be reduced and a capacity can be increased in a case of the CDMA mobile communication system.

It is to be noted that, in this fourth embodiment, the upper and lower limits of the transmission power at each base station may be determined by each base station as in the third embodiment when the perch channel transmission power at each base station is not known to the mobile station, or by the base station control station as in the second embodiment when the perch channel transmission power at each base station is known to the mobile station.

Figures 22, 23:
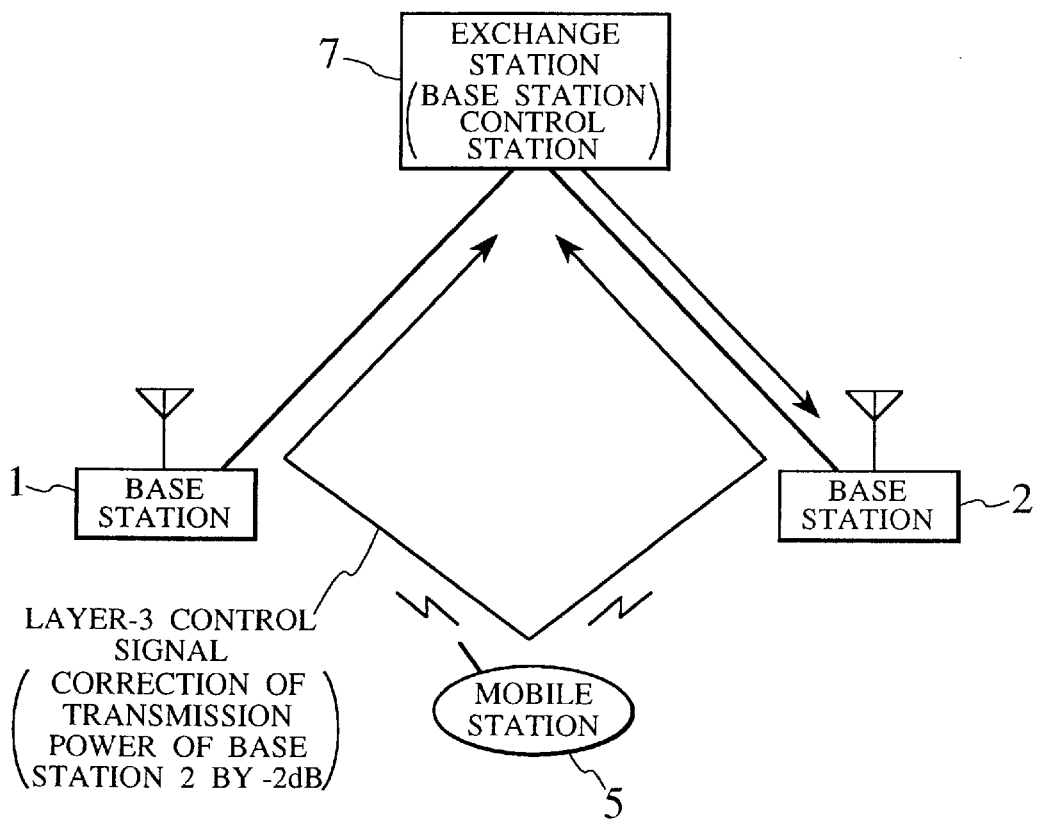
FIG. 22 is a schematic diagram of a mobile communication system showing the fifth specific embodiment of a downlink transmission power control scheme according to the present invention.
FIG. 23 is a table showing exemplary perch channel and communication channel receiving SIRs for explaining the fifth specific embodiment of the present invention.

Referring now to FIG. 22 and FIG. 23, a fifth specific embodiment of a downlink transmission power control scheme for a mobile communication system using the site diversity according to the present invention, which is another more specific embodiment based on the first and third basic embodiments described above, will be described in detail.

This fifth specific embodiment is directed to a case of correcting the transmission power of each base station according to a comparison of the perch channel receiving SIR and the communication channel receiving SIR measured at the mobile station, during the site diversity period. In this fifth specific embodiment, the configurations of the mobile station and the base station are substantially similar to those of FIG. 18 and FIG. 19 described above, but it is assumed that the base station control station 11 is functionally integrated into the exchange station 7 so that the control with respect to the base station control station function is to be realized by the control with respect to the exchange station 7.

In this fifth specific embodiment, when the perch channel receiving SIRs and the communication channel receiving SIRs for the base stations 1 and 2 as measured at the mobile station 5 are as indicated in FIG. 23, for example, it can be seen that the communication channel transmission power of the base station 1 is lower than the perch channel transmission power of the base station 1 by 15 dB, and the communication channel transmission power of the base station 2 is lower than the perch channel transmission power of the base station 2 by 13 dB. Then, assuming that the perch channel transmission powers of the base stations 1 and 2 are the same, it can be seen that the communication channel transmission power of the base station 2 is higher than the communication channel transmission power of the base station 1 by 2 dB.

Therefore, in a case of realizing the same the transmission power at every base station, it suffices for the mobile station 5 to transmit the layer-3 control signal for commanding a correction of the transmission power of the base station 2 for lowering it by 2 dB, as indicated in FIG. 22. Alternatively, it is also possible to realize a desired transmission power ratio according to a ratio of the perch channel receiving SIRs for the base stations 1 and 2.

Here, it is also possible to provide the command using the layer-3 control signal according to the need. For example, the command using the layer-3 control signal can be provided only when a required control amount is above a prescribed level.

Note that the layer-3 control signal is to be transmitted from the mobile station 5 through the base stations 1 and 2 and combined at the exchange station 7 first, and then transmitted from the exchange station 7 to a relevant base station, so that the reliability of the layer-3 control signal can be maintained at high level.

According to the downlink transmission power control of this fifth specific embodiment, a transmission power error can be made smaller at a base station which has a high error rate for the layer-1 control signal, and in addition, a transmission power ratio among the base stations can be controlled to any desired value, so that it is possible to increase a capacity in a case of the CDMA mobile communication system.

Figure 24:
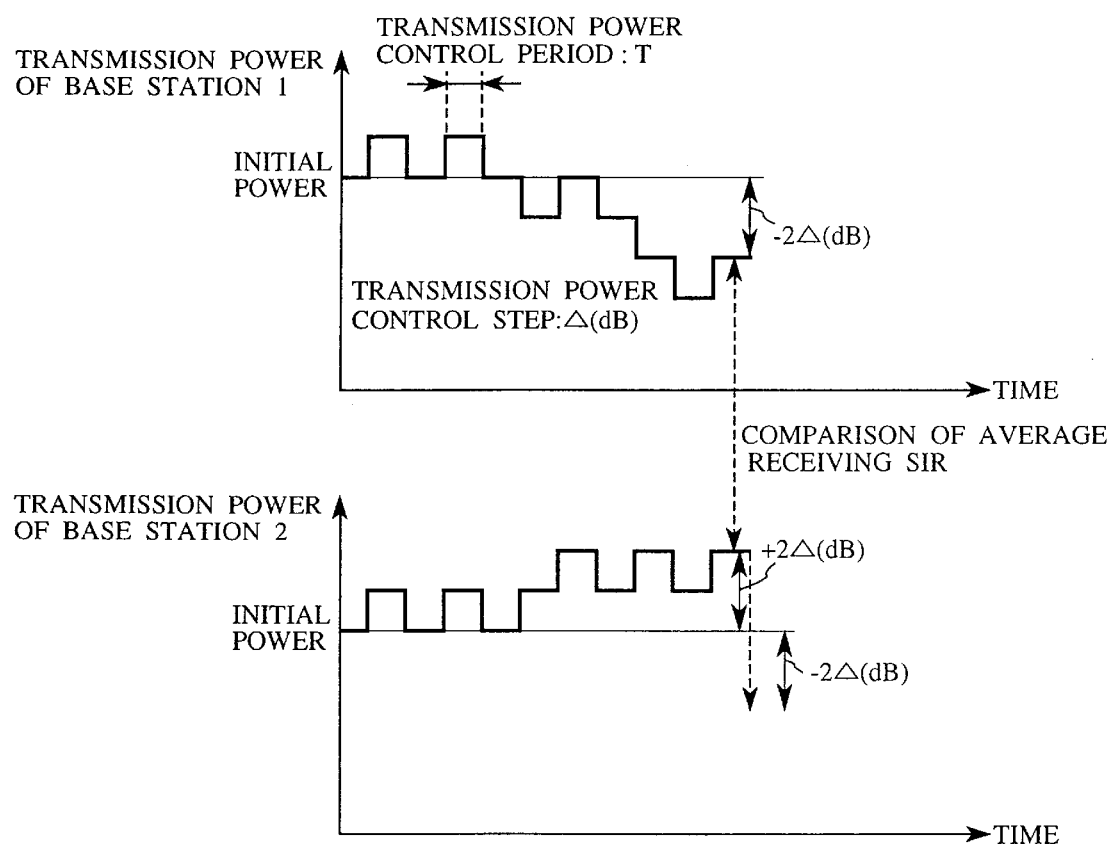
FIG. 24 is a graph showing exemplary base station transmission powers for explaining the sixth specific embodiment of the present invention.
Figure 25:
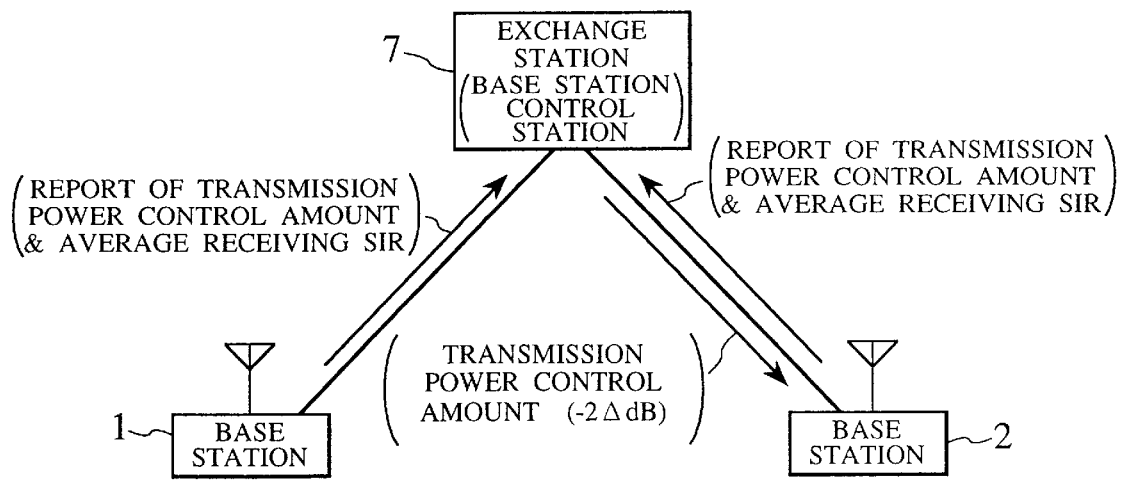
FIG. 25 is a schematic diagram of a mobile communication system showing the sixth specific embodiment of a downlink transmission power control scheme according to the present invention.

Referring now to FIG. 24 and FIG. 25, a sixth specific embodiment of a downlink transmission power control scheme for a mobile communication system using the site diversity according to the present invention, which is a more specific embodiment based on the fourth basic embodiments described above, will be described in detail.

In this sixth specific embodiment, the configurations of the mobile station and the base station are substantially similar to those of FIG. 18 and FIG. 19 described above, but it is assumed that the base station control station 11 is functionally integrated into the exchange station 7 so that the control with respect to the base station control station function is to be realized by the control with respect to the exchange station 7.

This sixth specific embodiment is directed to a case of correcting the transmission power of each base station according to a result of comparison of average receiving SIRs at the base stations, during the site diversity period. Here, the control unit 63 of each one of the base stations 1 and 2 periodically reports the received layer-1 control signal (transmission power control command) and an average receiving SIR within a prescribed period of time to the exchange station 7, as indicated in FIG. 25.

FIG. 24 shows exemplary transmission powers of the base stations 1 and 2 in this sixth specific embodiment. In this example, the base station 1 reports $-2\Delta$ (dB) as its transmission power control amount while the base station 2 reports $+2\Delta$ (dB) as its transmission power control amount.

Here, the transmission power control amount indicates an amount relative to the initial power to which the transmission power is to be controlled, where the initial power is to be subjected to the periodical updating.

The exchange station 7 then compares the average receiving SIRs reported from the base stations 1 and 2, and notifies the transmission power control amount of one base station which has the largest average receiving SIR among them to the every other base station. Each base station which received this notice of the transmission power control amount then corrects its transmission power by using the notified transmission power control amount, as indicated in FIG. 25. For instance, in an exemplary case shown in FIG. 24, when the average receiving SIR is larger for the base station 1, the transmission power control amount of $-2\Delta$ (dB) at the base station 1 is notified to the base station 2, and the base station 2 corrects its transmission power by using the notified transmission power control amount of $-2\Delta$ (dB), as indicated in FIG. 24, so that the transmission powers of the base stations 1 and 2 are controlled to be identical periodically.

In this manner, according to this sixth specific embodiment, the transmission power control amount at the base station 2 which has a lower receiving SIR (a lower receiving reliability) and a higher error rate for the layer-1 control signal is corrected by the transmission power control amount according to the layer-1 control signal received at the base station 1 which has a higher receiving SIR (a higher receiving reliability), so that the transmission powers of all the base stations are controlled to be identical periodically and thereby maintained at nearly the same level, while the transmission power control error can be suppressed to the minimum level even at the base station which has a higher error rate for the layer-1 control signal, and therefore a capacity can be increased in a case of the CDMA mobile communication system.

Figure 26:
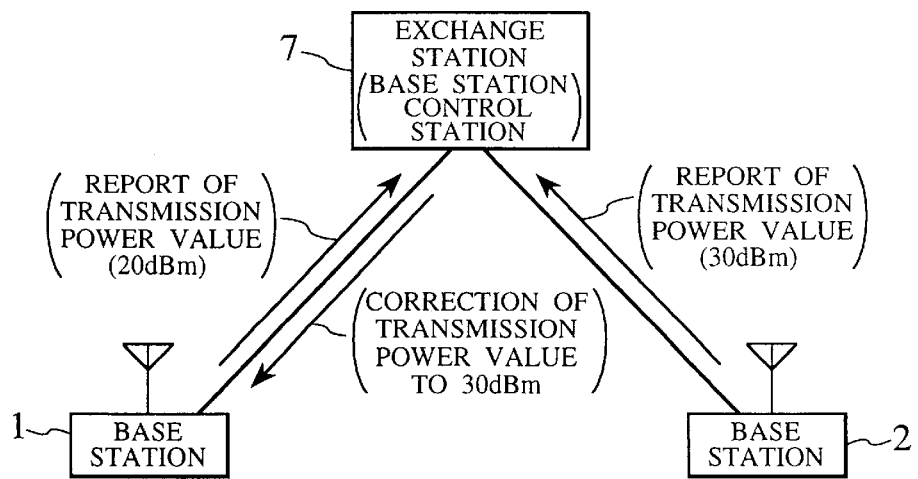
FIG. 26 is a schematic diagram of a mobile communication system showing the seventh specific embodiment of a downlink transmission power control scheme according to the present invention.

Referring now to FIG. 26, a seventh specific embodiment of a downlink transmission power control scheme for a mobile communication system using the site diversity according to the present invention, which is another more specific embodiment based on the fourth basic embodiments described above, will be described in detail.

In this seventh specific embodiment, the configurations of the mobile station and the base station are substantially similar to those of FIG. 18 and FIG. 19 described above, but it is assumed that the base station control station 11 is functionally integrated into the exchange station 7 so that the control with respect to the base station control station function is to be realized by the control with respect to the exchange station 7.

This seventh specific embodiment is directed to a case of correcting the transmission power of each base station according to a result of comparison of transmission power values at the base stations, during the site diversity period. Here, each one of the base stations 1 and 2 periodically reports the transmission power value used at the own station to the exchange station 7, as indicated in FIG. 26.

The exchange station 7 then compares the transmission power values reported from the base stations 1 and 2, and notifies the transmission power value of one base station which has the largest transmission power among them to the every other base station. Each base station which received this notice of the transmission power value then corrects its transmission power to the notified transmission power value, as indicated in FIG. 26. For instance, in an exemplary case shown in FIG. 26, when the transmission power value reported from the base station 2 is 30 dBm which is larger than 20 dBm reported from the base station 1, so that the this transmission power value of 30 dBm is notified to the base station 1, and the base station 1 corrects its transmission power to the notified transmission power value of 30 dBm.

In this manner, according to this seventh specific embodiment, the transmission power error at the base station 2 which has a higher error rate for the layer-1 control signal can be made smaller, and the transmission powers of the base stations can be maintained at nearly the same level, so that a capacity can be increased in a case of the CDMA mobile communication system. In addition, the transmission power is adjusted to be equal to the higher one, so that there is no quality degradation.

Note however that, instead of adjusting the transmission power to be equal to the higher one as described above, it is also possible to adjust the transmission power to be equal to the lower one. In such a case, there is a possibility for a quality degradation but the transmission power can be kept at the minimum necessary level so that a capacity can be increased.

It is to be noted here that, in the fifth to seventh specific embodiments described above, it is not absolutely necessary for the base station control station to be functionally integrated into the exchange station, and the base station control station and the exchange station may be provided separately as in the first to fourth specific embodiments described above, if desired.

It is also to be noted that, besides those already mentioned above, many modifications and variations of the above embodiments may be made without departing from the novel and advantageous features of the present invention.

Accordingly, all such modifications and variations are intended to be included within the scope-of the appended claims.

What is claimed is:

1. A method of downlink transmission power control in a mobile communication system formed by a plurality of base stations, a mobile station to be connected with the base stations via radio channels, and a base station control station for controlling the base stations, wherein the mobile communication system uses a site diversity in which the mobile station is simultaneously connected with more than one base stations and a diversity combining among said more than one base stations is carried out, the method comprising the steps of:

carrying out a primary downlink transmission power control using a primary control signal which is transmitted from the mobile station and terminated at each base station and not to be combined during a site diversity period; and carrying out an additional downlink transmission power control using additional control signals which are transmitted from the base station control station to the base stations.

2. The method of claim 1, wherein the primary downlink transmission power control is carried out at shorter time intervals than the additional downlink transmission power control.

3. The method of claim 1, wherein the primary control signal is a layer-1 control signal.

4. The method of claim 1, wherein the additional downlink transmission power control also uses a secondary control signal which is transmitted from the mobile station and terminated at the base station control station and to be combined during the site diversity period.

5. The method of claim 4, wherein the secondary control signal is a layer-3 control signal.

6. The method of claim 4, wherein the primary downlink transmission power control is carried out during a non-site diversity period, while the additional downlink transmission power control is carried out during the site diversity period.

7. The method of claim 6, wherein the primary downlink transmission power control is based on a receiving SIR of a communication channel at the mobile station, while the additional downlink transmission power control is based on a bit error rate or a frame error rate of the communication channel at the mobile station.

8. The method of claim 6, wherein the primary downlink transmission power control is based on a receiving SIR of a communication channel at the mobile station, while the additional downlink transmission power control is based on a receiving SIR of a perch channel at the mobile station.

9. The method of claim 6, wherein the primary downlink transmission power control and the additional downlink transmission power control are both based on a bit error rate or a frame error rate of a communication channel at the mobile station.

10. The method of claim 6, wherein the mobile station stops a transmission of a bit corresponding to the primary control signal during the site diversity period.

11. The method of claim 4, wherein the primary downlink transmission power control and the additional downlink transmission power control are both carried out during the site diversity period.

12. The method of claim 11, wherein the primary downlink transmission power control controls a transmission power of each base station, while the additional downlink transmission power control sets upper and lower limits for the transmission power of each base station according to a receiving SIR at the mobile station of a perch channel transmitted from each base station.

13. The method of claim 12, wherein the upper and lower limits for the transmission power of each base station are determined from a perch channel receiving SIR at the mobile station of a perch channel transmitted from said each base station, a perch channel transmission power at said each base station, and a target receiving SIR for a downlink communication channel at the mobile station.

14. The method of claim 13, wherein the secondary control signal notifies the perch channel receiving SIRs from the mobile station to the base station control station, the base station control station determines the upper and lower limits for the transmission power of each base station according to the secondary control signal, and the additional control signals notify the upper and lower limits for the transmission power of each base station from the base station control station to said each base station.

15. The method of claim 13, wherein the secondary control signal notifies the perch channel receiving SIRs from the mobile station to the base station control station, the additional control signals notify the perch channel receiving SIRs from the base station control station to each base station, and each base station determines the upper and lower limits for the transmission power of said each base station according to the additional control signals.

16. The method of claim 12, wherein the upper and lower limits for the transmission power of each base station are determined from a receiving SIR at the mobile station of a perch channel transmitted from one base station which has a smallest propagation loss with respect to the mobile station, a perch channel transmission power at said one base station, and a target receiving SIR for a downlink communication channel at the mobile station.

17. The method of claim 11, wherein the primary downlink transmission power control controls a transmission power of each base station, while the additional downlink transmission power control specifies a correction to the transmission power of at least one base station according to receiving SIRs at the mobile station of a perch channel and a communication channel transmitted from each base station.

18. The method of claim 17, wherein the secondary control signal notifies the correction for said at least one base station from the mobile station to the base station control station, and the additional control signals notify the correction for said at least one base station from the base station control station to said at least one base station.

19. The method of claim 17, wherein the correction corrects the transmission power of said at least one base station so as to make transmission powers of the base stations equal to each other.

20. The method of claim 17, wherein the correction corrects the transmission power of said at least one base station so as to make a desired transmission power ratio among the base stations according to a ratio of the receiving SIRs at the mobile station of perch channels transmitted from the base stations.

21. The method of claim 1, wherein the primary downlink transmission power control controls a transmission power of each base station independently, while the additional downlink transmission power control controls the transmission powers of the base stations to be identical during the site diversity period.

22. The method of claim 21, wherein each base station periodically reports to the base station control station a transmission power control amount due to the primary downlink transmission power control and a receiving reliability at said each base station during a prescribed period of time, the base station control station notifies one transmission power control amount reported from one base station which has a highest receiving reliability among the base stations to other base stations, and each other base station controls a transmission power at said each other base station by using said one transmission power control amount notified from the base station control station, so that the transmission powers of the base stations are controlled to be identical periodically.

23. The method of claim 21, wherein each base station periodically reports a transmission power value at said each base station to the base station control station, the base station control station notifies one transmission power value reported from one base station to other base stations, and each other base station controls a transmission power at said each other base station to said one transmission power value notified from the base station control station.

24. The method of claim 23, wherein said one transmission power value is largest among transmission power values reported from the base stations.

25. The method of claim 23, wherein said one transmission power value is smallest among transmission power values reported from the base stations.

26. A mobile communication system, comprising:
 a plurality of base stations;
 a mobile station to be connected with the base stations via radio channels, which transmits a primary control signal which is to be terminated at each base station and not to be combined during a site diversity period so as to carry out a primary downlink transmission power control at each base station according to the primary control signal; and
 a base station control station for controlling the base stations, which transmits additional control signals to the base stations so as to carry out an additional downlink transmission power control at the base stations according to the additional control signals;
 wherein the mobile communication system uses a site diversity in which the mobile station is simultaneously connected with more than one base stations and a diversity combining among said more than one base stations is carried out.

27. The mobile communication system of claim 26, wherein the primary downlink transmission power control is carried out at shorter time intervals than the additional downlink transmission power control.

28. The mobile communication system of claim 26, wherein the primary control signal is a layer-1 control signal.

29. The mobile communication system of claim 26, wherein the mobile station also transmits a secondary control signal which is to be terminated at the base station control station and to be combined during the site diversity period, in order to carry out the additional downlink transmission power control.

30. The mobile communication system of claim 29, wherein the secondary control signal is a layer-3 control signal.

31. The mobile communication system of claim 29, wherein the primary downlink transmission power control is carried out during a non-site diversity period, while the additional downlink transmission power control is carried out during the site diversity period.

32. The mobile communication system of claim 31, wherein the mobile station transmits the primary control signal based on a receiving SIR of a communication channel at the mobile station, and the secondary control signal based on a bit error rate or a frame error rate of the communication channel at the mobile station.

33. The mobile communication system of claim 31, wherein the mobile station transmits the primary control signal based on a receiving SIR of a communication channel at the mobile station, and the secondary control signal based on a receiving SIR of a perch channel at the mobile station.

34. The mobile communication system of claim 31, wherein the mobile station transmits the primary control signal and the secondary control signal which are both based on a bit error rate or a frame error rate of a communication channel at the mobile station.

35. The mobile communication system of claim 31, wherein the mobile station stops a transmission of a bit corresponding to the primary control signal during the site diversity period.

36. The mobile communication system of claim 29, wherein the primary downlink transmission power control and the additional downlink transmission power control are both carried out during the site diversity period.

37. The mobile communication system of claim 36, wherein the primary downlink transmission power control controls a transmission power of each base station, while the additional downlink transmission power control sets upper and lower limits for the transmission power of each base station according to a receiving SIR at the mobile station of a perch channel transmitted from each base station.

38. The mobile communication system of claim 37, wherein the upper and lower limits for the transmission power of each base station are determined from a perch channel receiving SIR at the mobile station of a perch channel transmitted from said each base station, a perch channel transmission power at said each base station, and a target receiving SIR for a downlink communication channel at the mobile station.

39. The mobile communication system of claim 38, wherein the secondary control signal notifies the perch channel receiving SIRs from the mobile station to the base station control station, the base station control station determines the upper and lower limits for the transmission power of each base station according to the secondary control signal, and the additional control signals notify the upper and lower limits for the transmission power of each base station from the base station control station to said each base station.

40. The mobile communication system of claim 38, wherein the secondary control signal notifies the perch channel receiving SIRs from the mobile station to the base station control station, the additional control signals notify the perch channel receiving SIRs from the base station control station to each base station, and each base station determines the upper and lower limits for the transmission power of said each base station according to the additional control signals.

41. The mobile communication system of claim 37, wherein the upper and lower limits for the transmission power of each base station are determined from a receiving SIR at the mobile station of a perch channel transmitted from one base station which has a smallest propagation loss with respect to the mobile station, a perch channel transmission power at said one base station, and a target receiving SIR for a downlink communication channel at the mobile station.

42. The mobile communication system of claim 36, wherein the primary downlink transmission power control controls a transmission power of each base station, while the additional downlink transmission power control specifies a correction to the transmission power of at least one base station according to receiving SIRs at the mobile station of a perch channel and a communication channel transmitted from each base station.

43. The mobile communication system of claim 42, wherein the secondary control signal notifies the correction for said at least one base station from the mobile station to the base station control station, and the additional control signals notify the correction for said at least one base station from the base station control station to said at least one base station.

44. The mobile communication system of claim 42, wherein the correction corrects the transmission power of said at least one base station so as to make transmission powers of the base stations equal to each other.

45. The mobile communication system of claim 42, wherein the correction corrects the transmission power of said at least one base station so as to make a desired transmission power ratio among the base stations according to a ratio of the receiving SIRs at the mobile station of perch channels transmitted from the base stations.

46. The mobile communication system of claim 26, wherein the primary downlink transmission power control controls a transmission power of each base station independently, while the additional downlink transmission power control controls the transmission powers of the base stations to be identical during the site diversity period.

47. The mobile communication system of claim 46, wherein each base station periodically reports to the base station control station a transmission power control amount due to the primary downlink transmission power control and a receiving reliability at said each base station during a prescribed period of time, the base station control station notifies one transmission power control amount reported from one base station which has a highest receiving reliability among the base stations to other base stations, and each other base station controls a transmission power at said each other base station by using said one transmission power control amount notified from the base station control station, so that the transmission powers of the base stations are controlled to be identical periodically.

48. The mobile communication system of claim 46, wherein each base station periodically reports a transmission power value at said each base station to the base station control station, the base station control station notifies one transmission power value reported from one base station to other base stations, and each other base station controls a transmission power at said each other base station to said one transmission power value notified from the base station control station.

49. The mobile communication system of claim 48, wherein said one transmission power value is largest among transmission power values reported from the base stations.

50. The mobile communication system of claim 48, wherein said one transmission power value is smallest among transmission power values reported from the base stations.

* * * * *